United States Patent
Satoh et al.

(10) Patent No.: US 9,361,249 B2
(45) Date of Patent: Jun. 7, 2016

(54) COMMUNICATION APPARATUS, COMMUNICATION SYSTEM AND ADAPTER

(71) Applicants: Tetsuya Satoh, Miyagi (JP); Noriyuki Terao, Miyagi (JP); Koji Takeo, Miyagi (JP); Hideaki Yamamoto, Kanagawa (JP); Junichi Ikeda, Miyagi (JP); Satoru Numakura, Miyagi (JP); Mitsuru Suzuki, Miyagi (JP); Hiroyuki Takahashi, Miyagi (JP); Kohki Sasaki, Iwate (JP)

(72) Inventors: Tetsuya Satoh, Miyagi (JP); Noriyuki Terao, Miyagi (JP); Koji Takeo, Miyagi (JP); Hideaki Yamamoto, Kanagawa (JP); Junichi Ikeda, Miyagi (JP); Satoru Numakura, Miyagi (JP); Mitsuru Suzuki, Miyagi (JP); Hiroyuki Takahashi, Miyagi (JP); Kohki Sasaki, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/566,001

(22) Filed: Dec. 10, 2014

(65) Prior Publication Data
US 2015/0095526 A1 Apr. 2, 2015

Related U.S. Application Data

(63) Continuation of application No. 13/044,938, filed on Mar. 10, 2011, now Pat. No. 8,938,567.

(30) Foreign Application Priority Data

Mar. 11, 2010 (JP) .................. 2010-053945
Dec. 16, 2010 (JP) .................. 2010-280393

(51) Int. Cl.
*G06F 13/00* (2006.01)
*G06F 13/12* (2006.01)
*G06F 13/40* (2006.01)

(52) U.S. Cl.
CPC ............ *G06F 13/128* (2013.01); *G06F 13/405* (2013.01)

(58) Field of Classification Search
CPC .. G06F 13/4022; G06F 13/4027; G06F 13/00
USPC .......................... 710/301–306, 316–317, 100
See application file for complete search history.

(56) References Cited

U.S. PATENT DOCUMENTS 5,781,747 A 7/1998 Smith et al.
7,062,594 B1 6/2006 Sardella et al.
(Continued)

FOREIGN PATENT DOCUMENTS

CN 101 242 371 A 8/2008
EP 2 146 286 1/2010
(Continued)

OTHER PUBLICATIONS

Office Action dated Dec. 17, 2014, issued in counterpart European Application No. 13181637.3.
(Continued)

*Primary Examiner* — Tim T Vo
*Assistant Examiner* — Kim T Huynh
(74) *Attorney, Agent, or Firm* — Oblon, McClelland, Maier & Neustadt, L.L.P.

(57) ABSTRACT

A communication apparatus for carrying out communications to and from an external apparatus that includes a first interconnecting unit and a first non-transparent port and effects an interconnection for communications via the first non-transparent port is provided. The communication apparatus includes a second interconnecting unit that includes a second non-transparent port communicably connected to the first non-transparent port. The second interconnecting unit effects an interconnection for communications via the second non-transparent port. The second interconnecting unit performs, when the communication apparatus carries out communications to and from the external apparatus, address translation between an address for use by the communication apparatus and an address for use by the second non-transparent port.

9 Claims, 23 Drawing Sheets

(56) References Cited

U.S. PATENT DOCUMENTS

| | | | |
|---|---|---|---|
| 7,421,532 | B2 | 9/2008 | Stewart et al. |
| 2006/0130137 | A1 | 6/2006 | Wewel et al. |
| 2006/0265520 | A1 | 11/2006 | Kwak et al. |
| 2007/0266179 | A1* | 11/2007 | Chavan ............... G06F 13/4022 709/250 |
| 2008/0043752 | A1 | 2/2008 | Mohrmann, III |
| 2008/0052443 | A1* | 2/2008 | Cassiday ............. G06F 13/4022 710/316 |
| 2008/0222340 | A1 | 9/2008 | Danilak |
| 2009/0144460 | A1 | 6/2009 | Lin et al. |
| 2009/0248947 | A1* | 10/2009 | Malwankar ........... G06F 13/404 710/316 |

FOREIGN PATENT DOCUMENTS

| | | |
|---|---|---|
| EP | 2 146 286 A2 | 1/2010 |
| JP | 2008-65818 | 3/2008 |
| JP | 2008-67242 | 3/2008 |
| JP | 2009-53946 | 3/2009 |
| JP | 2009-94778 | 4/2009 |
| WO | WO 2008/018485 A1 | 2/2008 |
| WO | WO 2008/053858 A2 | 5/2008 |
| WO | WO 2009/105095 A1 | 8/2009 |
| WO | WO 2009/137418 A1 | 11/2009 |

OTHER PUBLICATIONS

PCI Express Overview, Apr. 1, 2007, p. 1-66, www.plxtech.com/files/pdf/PLX PCIe Apr. 7 WEB.pdf.

European Search Report dated Jan. 23, 2014, in European Patent Application No. 13181637.3.

European Search Report dated Jan. 20, 2014, in European Patent Application No. 13181636.5.

Japanese Office Action dated Jul. 17, 2013, in Japanese Patent Application No. 2010-053945.

Jack Regula, et al. "Implementing Intelligent Adapters and Multi-host systems with PCI Express Technology." PCI Express System Architecture, Addison-Wesley, US, Sep. 30, 2009, pp. 999-1012, XP002333699, figures C1-6.

Jack Regula, "Using Non-Transparent Bridging in PCI Express Systems", Jun. 1, 2004, pp. 4-30, XP002686987, retrieved from the internet: URL: http://www.plxtech.com/files /pdf/technical/expresslane/NontransparentBridging.pdf.

Lee Mohrmann et al. "Creating Multicomputer Test Systems Using PCI and PCI Express", Autotestcon, 2009 IEEE, IEEE, Pisctaway, NJ, USA, Sep. 14, 2009, pp. 7-10, XP031560349, ISBN: 978-1-4244-4980-4.

"PCI Express External Cabling Specification", PCI-SIG, http://www.pcisig.com/specifications/pciexpress/pcie_cabling1.0/, Rev. 1.0, Jan. 26, 2007, pp. 77, 79 and 117.

European Search Report in English dated Aug. 2, 2011 issued in counterpart application EP 11 15 7614.6.

* cited by examiner

SSC: SPECTRUM SPREAD CLOCK
NSSC: NON-SPECTRUM-SPREAD CLOCK

SSC: SPECTRUM SPREAD CLOCK
NSSC: NON-SPECTRUM-SPREAD CLOCK

COMMUNICATION APPARATUS, COMMUNICATION SYSTEM AND ADAPTER

CROSS-REFERENCE TO RELATED APPLICATIONS

This application is a Continuation of U.S. patent application Ser. No. 13/044,938, filed Mar. 10, 2011, and is based upon and claims the benefit of priority from Japanese Patent Application No. 2010-053945 filed in Japan on Mar. 11, 2010 and Japanese Patent Application No. 2010-280393 filed in Japan on Dec. 16, 2010, the entire content of each of the foregoing applications is incorporated herein by reference.

BACKGROUND OF THE INVENTION

1. Field of the Invention

The present invention relates to communication apparatuses, communication systems and adapters.

2. Description of the Related Art

IEEE 802.3, one of specifications for data communications between information apparatuses, has become widespread.

Meanwhile, PCI Express (registered trademark) specifications released as successor of the older peripheral component interconnect (PCI) specifications, which are specifications for high-speed local bus connection of personal computers (PCs), are known. PCI Express having, in addition to high data transfer rate, flexibility for adaptation to various application software is widely utilized in expansion boards, such as graphics cards. In recent years, more and more communications between different apparatuses are carried out by using communications protocol of PCI Express; cable adapters compliant with a PCI Express specification are also known.

A PCI Express has two pairs (each for upstream and downstream) of data wires, or, put another way, four data wires that make up a lane, allowing full-duplex bi-directional serial transfer, per lane. As effective transfer rate, PCI Express supports a data rate up to 250 megabytes per second (MB/s) in each direction, per lane. This means that PCI Express with eight lanes is capable of providing a 2 gigabytes/s (GB/s) of effective transfer rate in each direction.

Information apparatuses, such as work stations and PCs, with a socket compliant with a PCI Express specification have come onto the market.

For instance, a data processing system for performing functions of a PCI Express feature card located away from a data processing system is disclosed in Japanese Patent Application Laid-open No. 2008-65818. The data processing system includes a circuit board and the PCI Express feature card. As compared to the circuit board, the PCI Express feature card appears to be located away from the circuit board, while, viewed from the circuit board, the PCI Express feature card appears to be located at the circuit board architecturally.

Disclosed in Japanese Patent Application Laid-open No. 2009-94778 is a network system including a first computer with a first expansion interface, a first network interface card (NIC) device connected to the first expansion interface, a second computer with a second expansion interface, a second NIC device connected to the second expansion interface, and a network cable connected to the first NIC device and the second NIC device. In the network system, the first NIC device includes a transmission buffer unit for storing predetermined signals fed from the first expansion interface and a first transmission unit for transmitting the signals stored in the transmission buffer unit to the network cable at predetermined timing; the second NIC device includes a reception buffer unit for storing the signals fed via the cable and a second transmission unit for transmitting the signals stored in the reception buffer unit to the second expansion interface.

For PCI Express cabling technology, see "PCI Express External Cabling 1.0 Specification", the PCI Special Interest Group (PCI-SIG), 26 Jan. 2007 (retrieved on 26 Jan. 2007 from the Internet: <URL: http://www.pcisig.com/specifications/pciexpress/pcie_cabling g1.0/>), which is a specification introduced in January 2007 by PCI-SIG, the organization responsible for specifying PCI Express.

PCI Express does not presume a device tree including a plurality of root complexes but presumes that the system has a device tree structure with a single root complex at the top. Accordingly, in typical application of PCI Express, communications between or among a plurality of hosts, each individually having a root complex, cannot be carried out.

As a solution to such a problem, vendors that provide switches (hereinafter, "PCI-e switches") compliant with a PCI Express specification have introduced PCI-e switches with non-transparent port on the market. A non-transparent port is a port, through which an apparatus on the other end of communications is nontransparent. When two hosts are connected to each other via a non-transparent port of a PCI-e switch, initialization or the like of the hosts can be individually performed without interfering with each other; in addition, a main control entity (central processing unit (CPU)) of each of the hosts can access resources of the other one of the hosts while operating separately.

An example configuration where two hosts are connected to each other via a non-transparent port of a PCI-e switch is disclosed in Japanese Patent Application Laid-open No. 2008-67242. In Japanese Patent Application Laid-open No. 2008-67242, a configuration where each of an image processing unit (host) and an information processing unit (host) includes a data transfer unit so that the data transfer unit of the image processing unit and the data transfer unit of the information processing unit are connected to each other via a non-transparent port of a PCI-e switch to prevent a network from being occupied by data transfer from a digital multifunction periphery to any one of an external computer or the information processing unit.

However, the conventional configuration, in which the two hosts are connected to each other via the non-transparent port of the PCI-e switch is disadvantageous in that in a situation where, for instance, the two hosts are connected to each other with a cable, disconnecting the cable that connects the hosts together can result in system hang-up and that a restriction can be imposed on a startup order of the hosts. Hence, the conventional configuration provides unfavorable usability as a system for carrying out communications.

Meanwhile, it is determined that regulation regarding electromagnetic interference (EMI) that may be emitted by electronic equipment and a system including electronic equipment is becoming more stringent. Under such a circumstance, optical communication that emits less electromagnetic interference (EMI) even at relatively short distances (in a range from approximately one meter to some dozen meters) is likely to be more common.

For instance, in a conventional optical communication system, to carry out data communications between information apparatuses each having a socket compliant with a PCI Express specification, it is necessary for a sender, being one of the information apparatuses, to convert transmitting information from the PCI Express specification into the IEEE 802.3 specification to transmit the thus-converted information, while it is necessary for a receiver, being the other information apparatus, to convert the information fed from the sender from the IEEE 802.3 specification into the PCI Express specification to receive the information. This means that a chip for performing the conversion at high speed needs to be mounted on a communication adapter inserted into the socket compliant with the PCI Express specification, which disadvantageously increases cost. In addition, conversion into the IEEE 802.3 specification involves addition of various header information pieces, which disadvantageously decreases effective transfer rate.

Each of the data processing system disclosed in Japanese Patent Application Laid-open No. 2008-65818 and the network system disclosed in Japanese Patent Application Laid-open No. 2009-94778 puts no consideration for EMI.

SUMMARY OF THE INVENTION

It is an object of the present invention to at least partially solve the problems in the conventional technology.

According to one aspect of the present invention, a communication apparatus for carrying out communications to and from an external apparatus, the external apparatus including a first interconnecting unit having a first non-transparent port and effecting an interconnection for communications via the first non-transparent port, the communication apparatus includes: a second interconnecting unit including a second non-transparent port communicably connected to the first non-transparent port, the second interconnecting unit effecting an interconnection for communications via the second non-transparent port, wherein the second interconnecting unit performs, when the communication apparatus carries out communications to and from the external apparatus, address translation between an address for use by the communication apparatus and an address for use by the second non-transparent port.

According to another aspect of the present invention, a communication system including a first apparatus and a second apparatus, the first apparatus and the second apparatus being communicably connected to each other, the communication system includes: a first interconnecting unit provided on the first apparatus, including a first non-transparent port, and effecting an interconnection for communications via the first non-transparent port; and a second interconnecting unit provided on the second apparatus, including a second non-transparent port, and effecting an interconnection for communications via the second non-transparent port, the second non-transparent port being communicably connected to the first non-transparent port, wherein the first interconnecting unit performs, when the first apparatus carries out communications to and from the second apparatus, address translation between an address for use by the first apparatus and an address for use by the first non-transparent port, and the second interconnecting unit performs, when the second apparatus carries out communications to and from the first apparatus, address translation between an address for use by the second apparatus and an address for use by the second non-transparent port.

According to still another aspect of the present invention, an adapter for apparatus-to-apparatus data communications via a transmission medium, the adapter being provided between the transmission medium and an apparatus and includes: at least one socket, into which a connector to be connected to the transmission medium is inserted; a board including the at least one socket mounted on the board, a connector to be connected with the apparatus, and wiring patterns, the wiring patterns electrically connecting the connecter to the at least one socket; and a device provided midway of the wiring patterns to split a clock domain of the wiring patterns into a first clock domain where spectrum spread clock is applied and a second clock domain where non-spectrum-spread clock is applied.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. Although application examples, each embodied by applying an aspect of the present invention to a communication system for PCI-Express-compliant communications, are described below, systems, to which the invention is applicable, are not limited thereto.

Overview

An overview of an embodiment of the present invention is described below based on comparison with a conventional technique. Generally, a topology of a system compliant with a PCI Express specification is a tree structure where a single root complex is at the top. In a communication system where two hosts carry out communications therebetween, each of the hosts has a root complex; accordingly, communications between the hosts is typically achieved by connecting the hosts to each other by using a switch having a non-transparent (NT) port.

Figure 1:
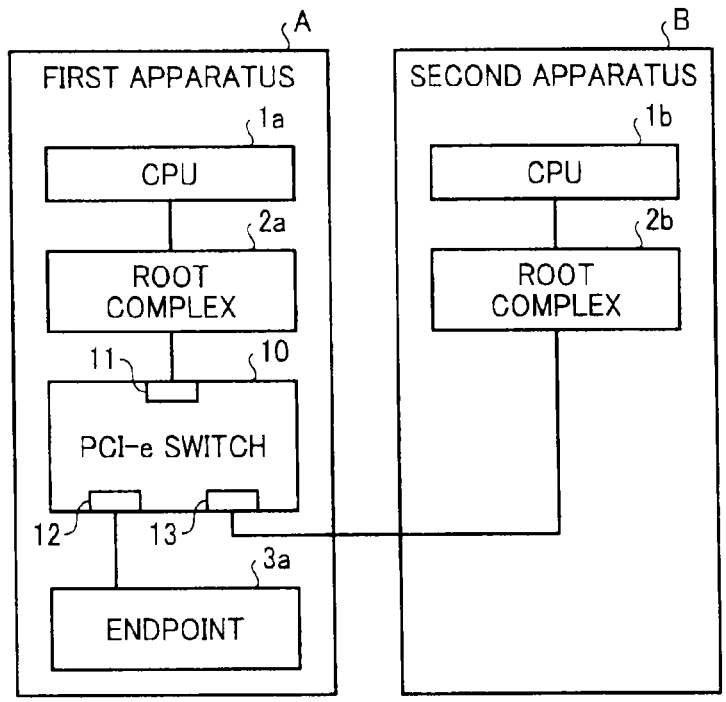
FIG. 1 is a conceptual diagram of a conventional communication system for data communications compliant with a PCI Express specification between two hosts.

FIG. 1 is a conceptual diagram of a conventional communication system for carrying out data communications compliant with a PCI Express specification between two hosts. In the communication system illustrated in FIG. 1, a first apparatus A and a second apparatus B are communicably connected to each other. The first apparatus A is a host including a CPU 1a, which is a main control entity. The second apparatus B is a host including a CPU 1b, which is a main control entity.

The first apparatus A includes a PCI-e switch 10. An upstream port 11 of the PCI-e switch 10 is connected to a root complex 2a. An endpoint 3a is connected to a downstream port 12 of the PCI-e switch 10. The PCI-e switch 10 effects an interconnection for communications between the root complex 2a connected to the upstream port 11 and the endpoint 3a connected to the downstream port 12.

The PCI-e switch 10 includes, in addition to the downstream port 12, which is typically provided, an NT port 13 as another downstream port. The NT port 13 is connected to a root complex 2b of the second apparatus B. The PCI-e switch 10 effects an interconnection for communications between the root complex 2a, which is connected to the upstream port 11, of the first apparatus A and the root complex 2b, which is connected to the NT port 13, of the second apparatus B.

In the communication system configured as discussed above, the root complex 2b of the second apparatus B is connected to the NT port 13 of the PCI-e switch 10 provided in the first apparatus A. Hence, the root complex 2b of the second apparatus B is nontransparent to (appears to be hidden from) the root complex 2a of the first apparatus A, while the root complex 2a of the first apparatus A is nontransparent to the root complex 2b of the second apparatus B. Accordingly, even when the system includes two root complexes, or, more specifically, the root complexes 2a and 2b, data communications compliant with a PCI Express specification can be carried out; that is, host-to-host communications between the first apparatus A and the second apparatus B are achieved.

However, in the conventional communication system illustrated in FIG. 1, the NT port 13 of the first apparatus A is transparent to the root complex 2b of the second apparatus B. Hence, the second apparatus B recognizes the NT port 13 of the first apparatus A as a device. Accordingly, in a situation where, for instance, the NT port 13 of the PCI-e switch 10 and the root complex 2b of the second apparatus B are connected to each other with a communication cable, disconnection of the communication cable causes the second apparatus B to fail to recognize the NT port 13 of the first apparatus A as a device, causing an error to occur and resulting in system hang-up.

The conventional communication system is also disadvantageous in that a restriction is imposed on a startup order of the apparatuses at system startup such that link is not established normally unless the second apparatus B is started up after the first apparatus A has been started and stabilized.

Furthermore, in the conventional communication system illustrated in FIG. 1, the PCI-e switch 10 is required to perform address translation between an address for use by the first apparatus A and an address for use by the second apparatus B when the first apparatus A and the second apparatus B carry out communications therebetween. This address translation can be disadvantageously cumbersome.

Figure 2:
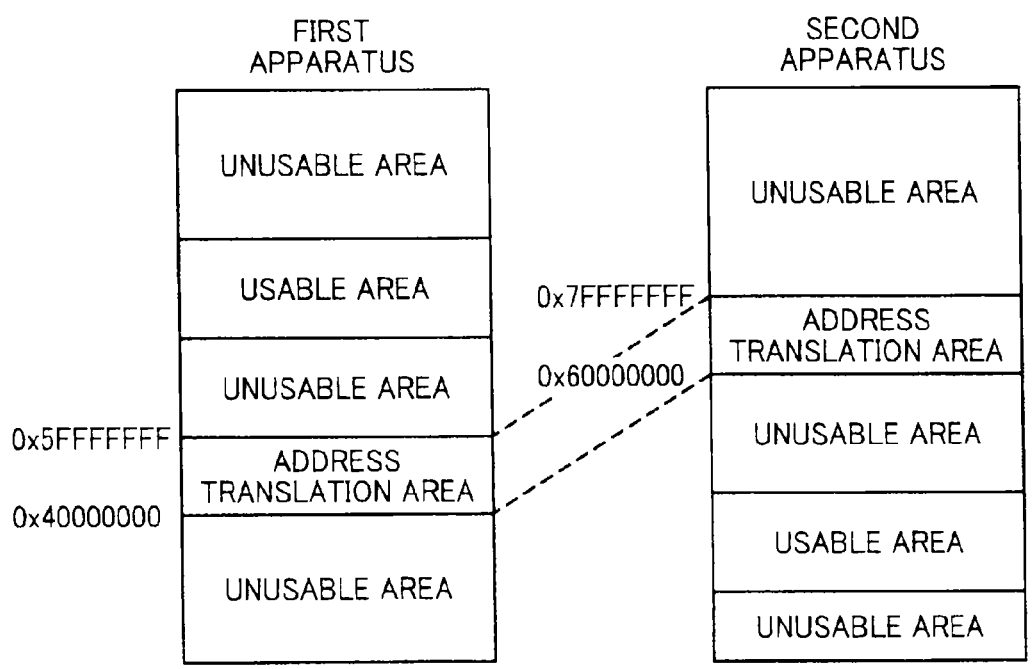
FIG. 2 is a conceptual diagram of an address map of the conventional communication system illustrated in FIG. 1.

FIG. 2 is a conceptual diagram of an address map of the conventional communication system illustrated in FIG. 1. The first apparatus A uses an address in an address translation area defined in a usable area in an address space of the first apparatus A. The second apparatus B uses an address in an address translation area defined in a usable area in an address space of the second apparatus B. The PCI-e switch 10 performs address translation between an address for use by the first apparatus A and an address for use by the second apparatus B when the first apparatus A and the second apparatus B carry out communications therebetween. Accordingly, it is necessary for the PCI-e switch 10 to have information about not only the address translation area of the first apparatus A but also about the address translation area of the second apparatus B.

However, it is not easy for the PCI-e switch 10 provided in the first apparatus A to have the information about the address translation area of the second apparatus B because the address space of the second apparatus B is hidden from the first apparatus A. Furthermore, it is required to shift the address translation area depending on the unusable area in the address space of each of the apparatuses because the unusable area can vary depending on memory or I/O. This makes it considerably difficult for the PCI-e switch 10 to have the information about the address translation area of the second apparatus B at all times. Hence, address translation to be performed by the PCI-e switch 10 can be considerably cumbersome.

As discussed above, although the conventional communication system illustrated in FIG. 1 allows host-to-host communications between the first apparatus A and the second apparatus B, the communication system is disadvantageous in providing unfavorable usability as a system because of such a problem that disconnecting the communication cable can result in system hang-up, a problem that a restriction is imposed on startup order of the apparatuses, and a problem that address translation to be performed by the PCI-e switch 10 can be cumbersome.

Figure 3:
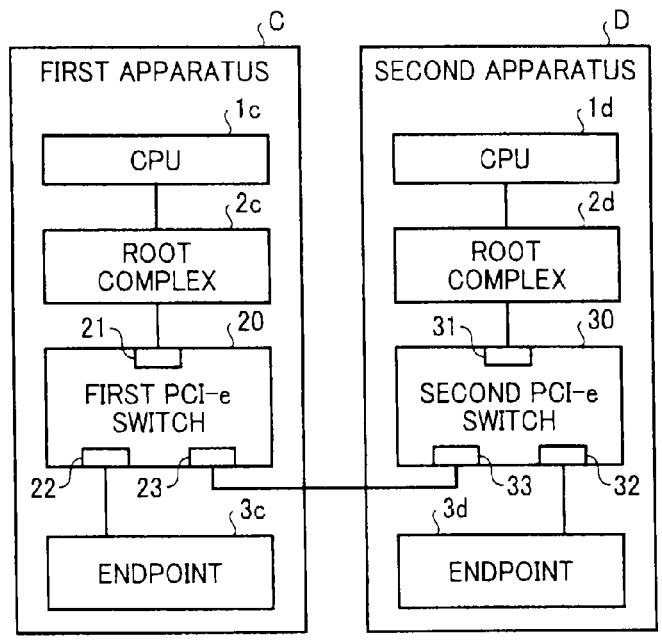
FIG. 3 is a conceptual diagram of a communication system according to an embodiment of the present invention.

FIG. 3 is a conceptual diagram of a communication system according to the embodiment of the present invention. The communication system illustrated in FIG. 3 includes a first apparatus C and a second apparatus D communicably connected to each other as with the conventional communication system illustrated in FIG. 1. The first apparatus C is a host including a CPU 1*c*, which is a main control entity. The second apparatus D is a host including a CPU 1*d*, which is a main control entity.

The first apparatus C includes a first PCI-e switch 20. An upstream port 21 of the PCI-e switch 20 is connected to a root complex 2*c*. An endpoint 3*c* is connected to a downstream port 22 of the first PCI-e switch 20. The first PCI-e switch 20 effects an interconnection for communications between the root complex 2*c* connected to the upstream port 21 and the endpoint 3*c* connected to the downstream port 22.

The first PCI-e switch 20 includes, in addition to the downstream port 22, which is typically provided, an NT port 23 as another downstream port. The NT port 23 is connected to an NT port 33 of a second PCI-e switch 30, which will be described later, provided on the second apparatus D. When the first apparatus C and the second apparatus D carry out communications therebetween, the first PCI-e switch 20 performs address translation between an address for use by the first apparatus C and an address for use by the NT port 23 to thereby effect an interconnection for the communications via the NT port 23.

The second apparatus D includes the second PCI-e switch 30. An upstream port 31 of the PCI-e switch 30 is connected to a root complex 2*d*. An endpoint 3*d* is connected to a downstream port 32 of the second PCI-e switch 30. The second PCI-e switch 30 effects an interconnection for communications between the root complex 2*d* connected to the upstream port 31 and the endpoint 3*d* connected to the downstream port 32.

The second PCI-e switch 30 includes, in addition to the downstream port 32, which is typically provided, the NT port 33 as another downstream port. The NT port 33 is connected to the NT port 23 of the first PCI-e switch 20 provided on the first apparatus C. When the first apparatus C and the second apparatus D carry out communications therebetween, the second PCI-e switch 30 performs address translation between an address for use by the second apparatus D and an address for use by the NT port 33 to thereby effect an interconnection for the communications via the NT port 33.

In the communication system configured as discussed above, the NT port 23 of the first PCI-e switch 20 provided on the first apparatus C and the NT port 33 of the second PCI-e switch 30 provided on the second apparatus D are connected to each other. Accordingly, the second apparatus D is nontransparent to the first apparatus C while the first apparatus C is nontransparent to the second apparatus D. The first apparatus C does not recognize the NT port 33 of the second apparatus D as a device; similarly, the second apparatus D does not recognize the NT port 23 of the first apparatus C as a device. Accordingly, in a situation where the NT port 23 of the PCI-e switch 20 and the NT port 33 of the PCI-e switch 30 are connected to each other with a communication cable, even if the communication cable is disconnected, an error is not detected and therefore system hang-up will not occur.

Furthermore, no restriction is imposed on a startup order of the apparatuses because link is established normally irrespective of which one of the first apparatus C and the second apparatus D is started up earlier.

Furthermore, the configuration where the NT port 23 of the PCI-e switch 20 and the NT port 33 of the PCI-e switch 30 are connected to each other makes address translation to be performed to carry out communications between the first apparatus C and the second apparatus D considerably easy as compared to that of the conventional communication system illustrated in FIG. 1.

Figure 4:
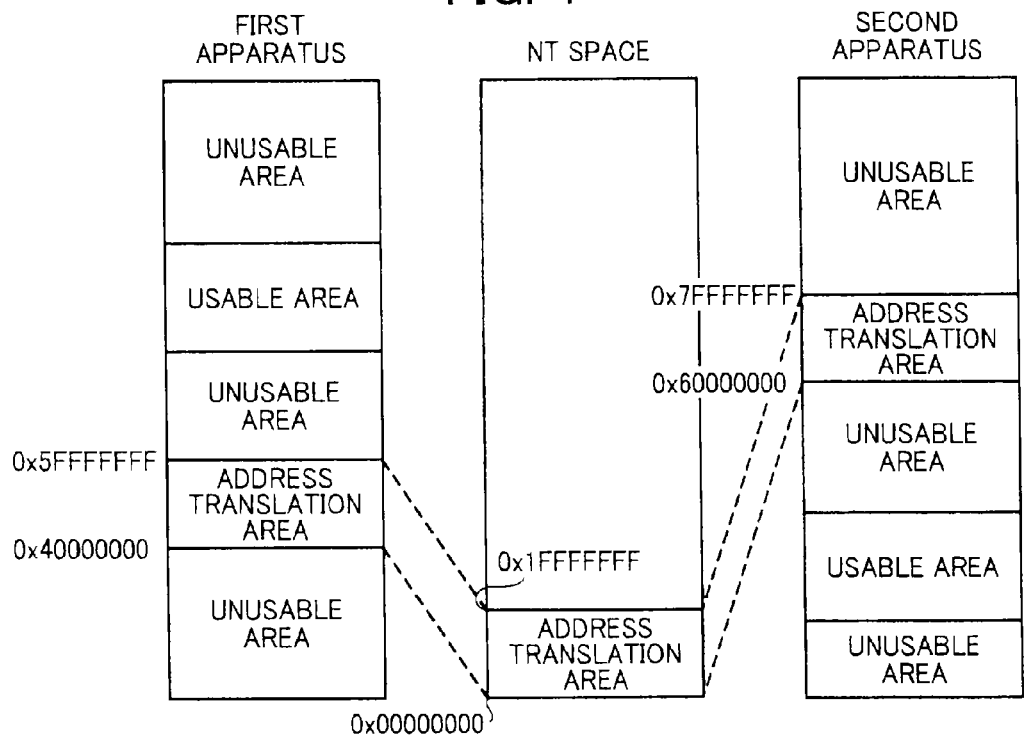
FIG. 4 is a conceptual diagram of an address map of the communication system illustrated in FIG. 3.

FIG. 4 is a conceptual diagram of an address map of the communication system illustrated in FIG. 3. In the present embodiment, a non-transparent (NT) space, which is an independent, single address space, can be defined by virtue of the NT-port-to-NT-port connection between the NT port 23 and the NT port 33. Hence, an address translation area can be defined in the NT space as a fixed area in advance.

When the first apparatus C and the second apparatus D carry out communications therebetween, the first apparatus C uses an address in an address translation area in the address space of the first apparatus C, while the second apparatus D uses an address in an address translation area in the address space of the second apparatus D. The NT port 23 of the first PCI-e switch 20 performs address translation between the address for use by the first apparatus C and an address in the address translation area in the NT space. The NT port 33 of the second PCI-e switch 30 performs address translation between the address for use by the second apparatus D and an address in the address translation area in the NT space.

The address translation area is defined in the NT space as a fixed area in advance, and the first PCI-e switch 20 and the second PCI-e switch 30 share addresses in this address translation area. Accordingly, the first PCI-e switch 20 needs only have information about the address translation area of the first apparatus C; the second PCI-e switch 30 needs only have information about the address translation area of the second apparatus D. Put another way, the first PCI-e switch 20 can perform address translation appropriately without having information about the address translation area of the second apparatus D; the second PCI-e switch 30 can perform address translation appropriately without having information about the address translation area of the first apparatus C. This facilitates address translation to be performed when the first apparatus C and the second apparatus D carry out communications therebetween.

As discussed above, the communication system according to the present embodiment provides a solution to the problem that disconnecting the communication cable can cause a system hang-up to occur and the problem that a restriction is imposed on startup order of the apparatuses, and facilitates address translation that is to be performed when carrying out communications. As discussed above, the communication system according to the present embodiment achieves appropriate host-to-host communications without sacrificing ease of operability.

Figure 5:
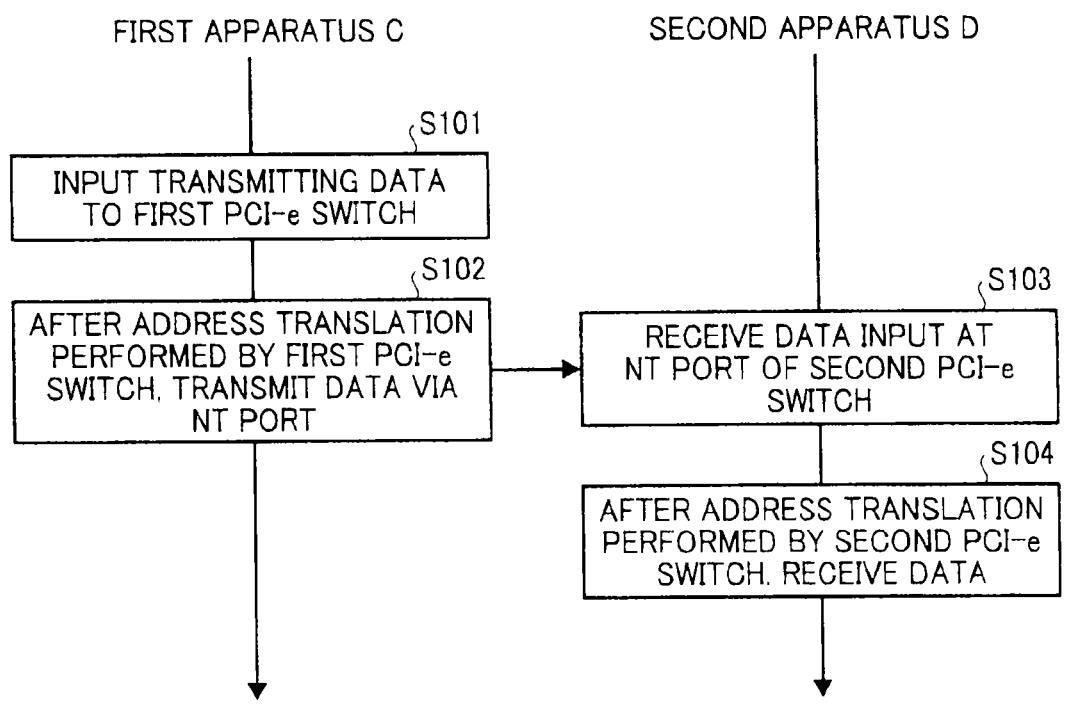
FIG. 5 is a timing diagram illustrating operations to be performed to transmit data from a first apparatus to a second apparatus in the communication system illustrated in FIG. 3.

FIG. 5 is a timing diagram illustrating operations to be performed to transmit data from the first apparatus C to the second apparatus D in the communication system illustrated in FIG. 3.

To transmit data to the second apparatus D, the first apparatus C inputs transmitting data to the first PCI-e switch 20 first (Step S101). On receiving the data, the first PCI-e switch 20 translates an address for use by the first apparatus C to transmit this data to an address in the NT space for use by the NT port 23 and transmits the data via the NT port 23 (Step S102).

The data transmitted via the NT port 23 of the first PCI-e switch 20 is input to the NT port 33 of the second PCI-e switch 30 (Step S103). When the data is thus input via the NT port 33, the second PCI-e switch 30 translates the address, which is the address in the NT space and translated (allocated) by the first PCI-e switch 20, into an address for use by the second apparatus D (Step S104). This allows the second apparatus D to receive the data transmitted from the first apparatus C.

To transmit data from the second apparatus D to the first apparatus C, in reverse of the example mentioned above, the second PCI-e switch 30 translates an address for use by the second apparatus D to transmit the data to an address, in the NT space, for use by the NT port 33; the first PCI-e switch 20 translates the address, which is the address in the NT space and translated (allocated) by the second PCI-e switch 30, into an address for use by the first apparatus C.

Meanwhile, to reduce electromagnetic interference (EMI) in the communication system, spectrum spread clock (SSC) can be effectively used as reference clock of the first apparatus C and as reference clock of the second apparatus D. However, this causes host-to-host communications to fail because the first apparatus C that operates on SSC and the second apparatus D that operates on SSC are not synchronized in communications.

Hence, a switch having a clock isolation feature is desirably used as the first PCI-e switch 20 and the second PCI-e switch 30 each. The clock isolation feature is capability of splitting a clock domain at the switch serving as a boundary.

By virtue of the clock isolation feature of the first PCI-e switch 20, a clock domain of the first apparatus C can be split into a clock domain on the side of the NT port 23 and a clock domain on the other side. By virtue of the clock isolation feature of the second PCI-e switch 30, a clock domain of the second apparatus D can be split into a clock domain on the side of the NT port 33 and a clock domain on the other side. This configuration allows clock of a clock domain between the NT port 23 of the first PCI-e switch 20 and the NT port 33 of the second PCI-e switch 30 to be isolated from clock of a clock domain of the first apparatus C and the second apparatus D. Applying the non-spectrum-spread clock (NSSC) to the clock domain between the NT port 23 and the NT port 33 allows the first apparatus C and the second apparatus D to carry out communications therebetween appropriately while simultaneously causing the first apparatus C and the second apparatus D to operate on SSC so as to reduce EMI.

This can be implemented by supplying NSSC to the side, on which the NT port 23 is provided, of the first PCI-e switch 20 and to the side, on which the NT port 33 is provided, of the second PCI-e switch 30 from a clock source different from a clock source for the first apparatus C and the second apparatus D, and causing NSSC on the side of the NT port 23 of the first PCI-e switch 20 and NSSC on the side of the NT port 33 of the second PCI-e switch 30 to be synchronized.

Sample Embodiment

As a sample embodiment, an example where the present embodiment is applied to a print system including a server and a printer is described below in detail.

Figure 6:
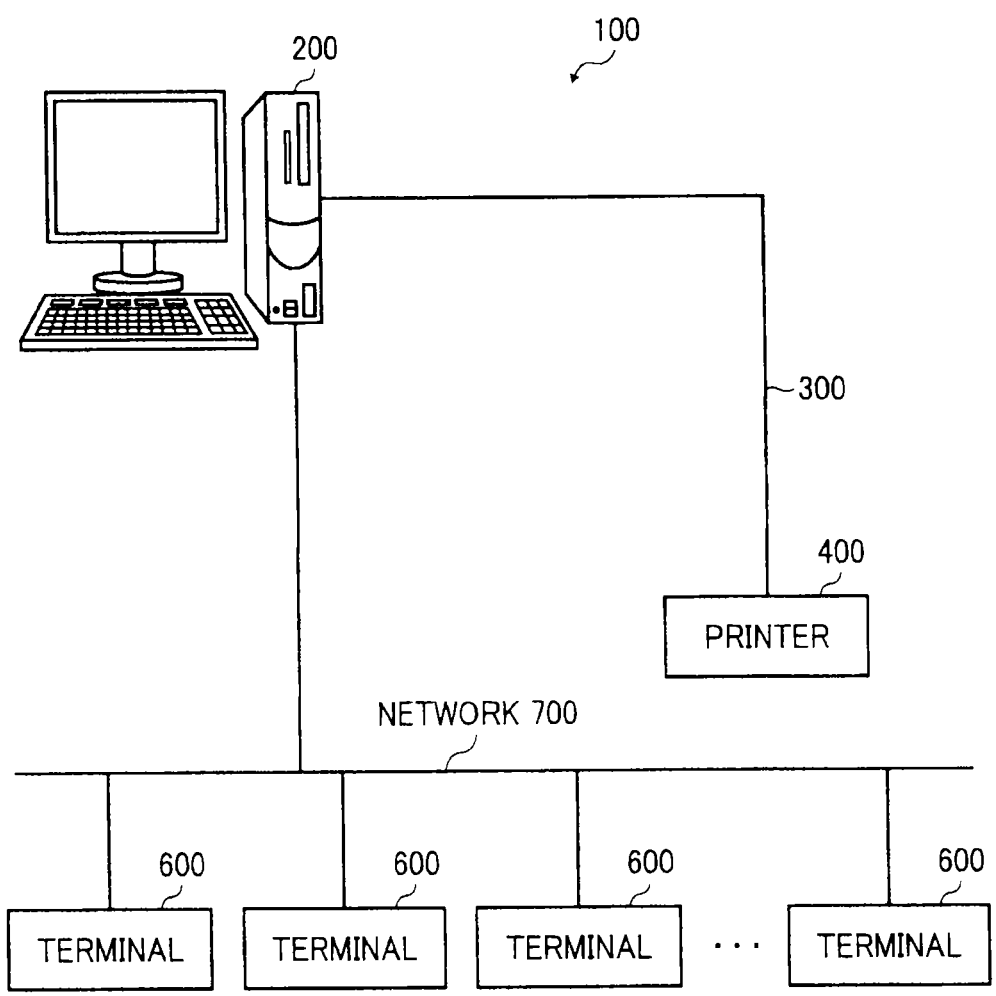
FIG. 6 is a schematic configuration diagram of a print system according to a sample embodiment.

FIG. 6 is a schematic configuration diagram of a print system 100 according to the sample embodiment. The print system 100 includes a server 200 and a printer 400 connected to each other via a communication cable 300. The server 200 is what is called a print server and connected to a plurality of terminals 600 (e.g., PCs) via a network 700.

Figure 7:
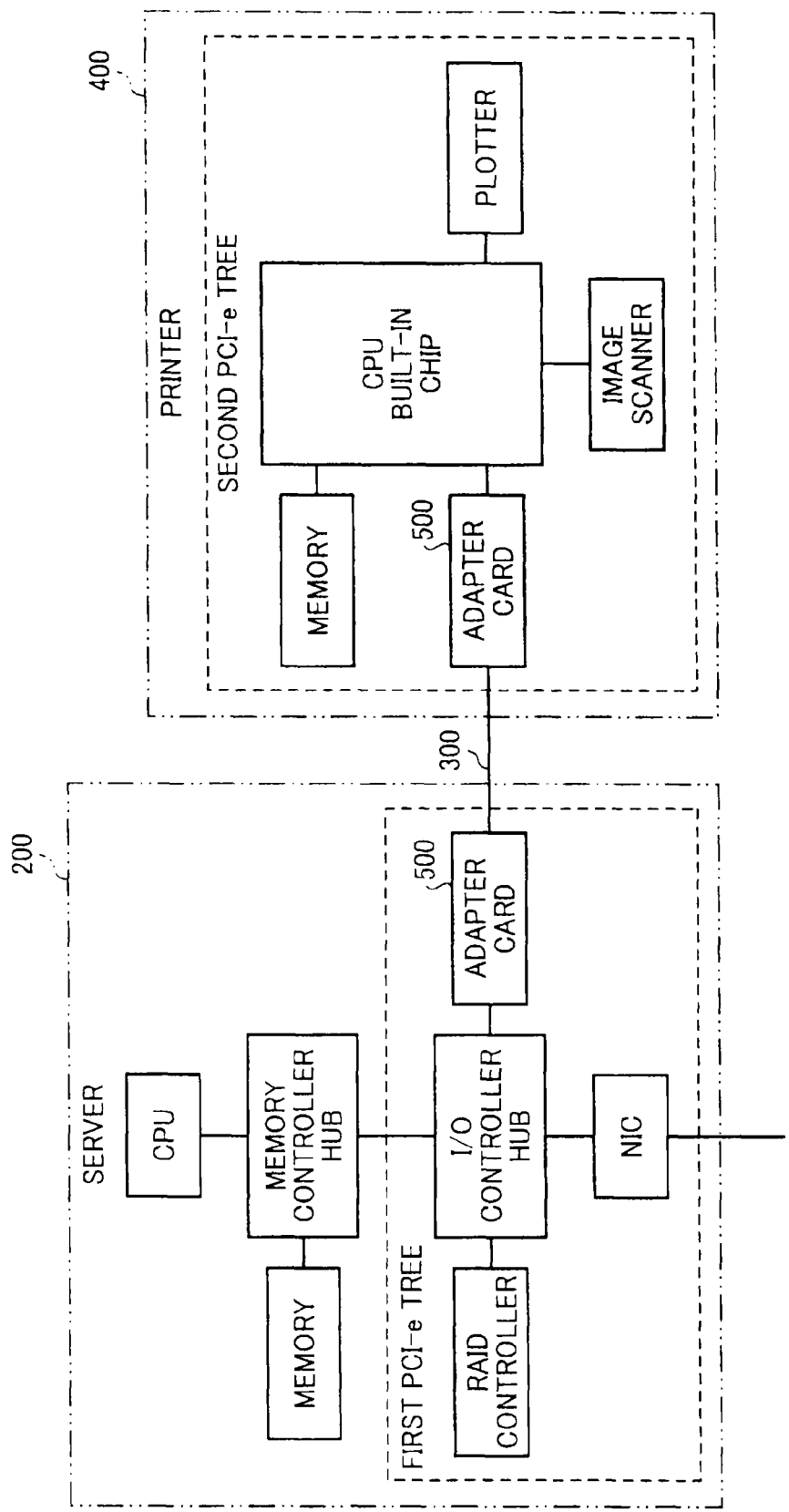
FIG. 7 is a schematic diagram illustrating an example of a group of devices in a server and a group of devices in a printer.
Figure 8:
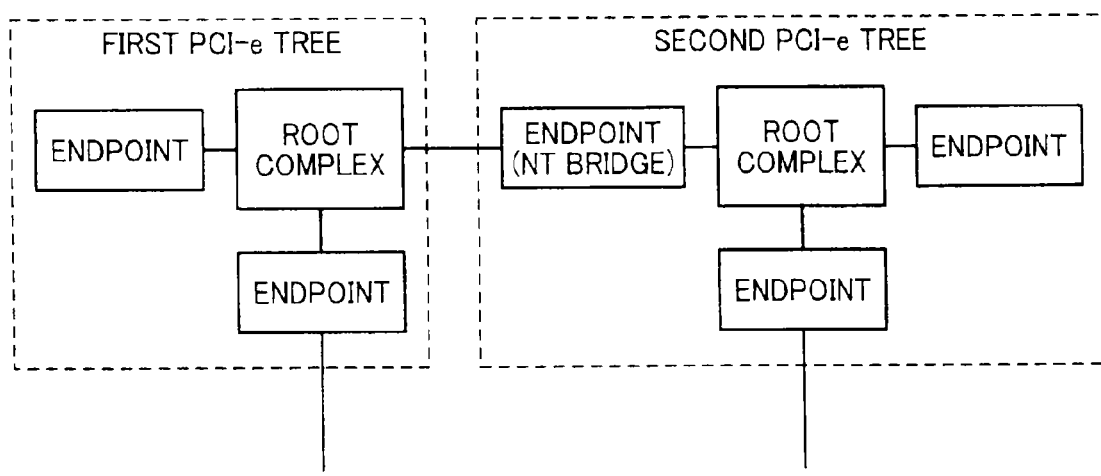
FIG. 8 is a diagram illustrating a PCI Express tree of the server and that of the printer.

Each of the server 200 and the printer 400 includes a group of devices connected in a tree topology according to a PCI Express specification. An example of the devices is illustrated in FIG. 7. The tree topology specified in the PCI Express specification is, as illustrated in FIG. 8, a tree structure, in which a root complex is at the top and the root complex is connected to endpoints.

In the print system 100 of the sample embodiment, each of the server 200 and the printer 400 functions as a host; the server 200 corresponds to the first apparatus C illustrated in FIG. 3; the printer 400 corresponds to the second apparatus D illustrated in FIG. 3.

Figure 9:
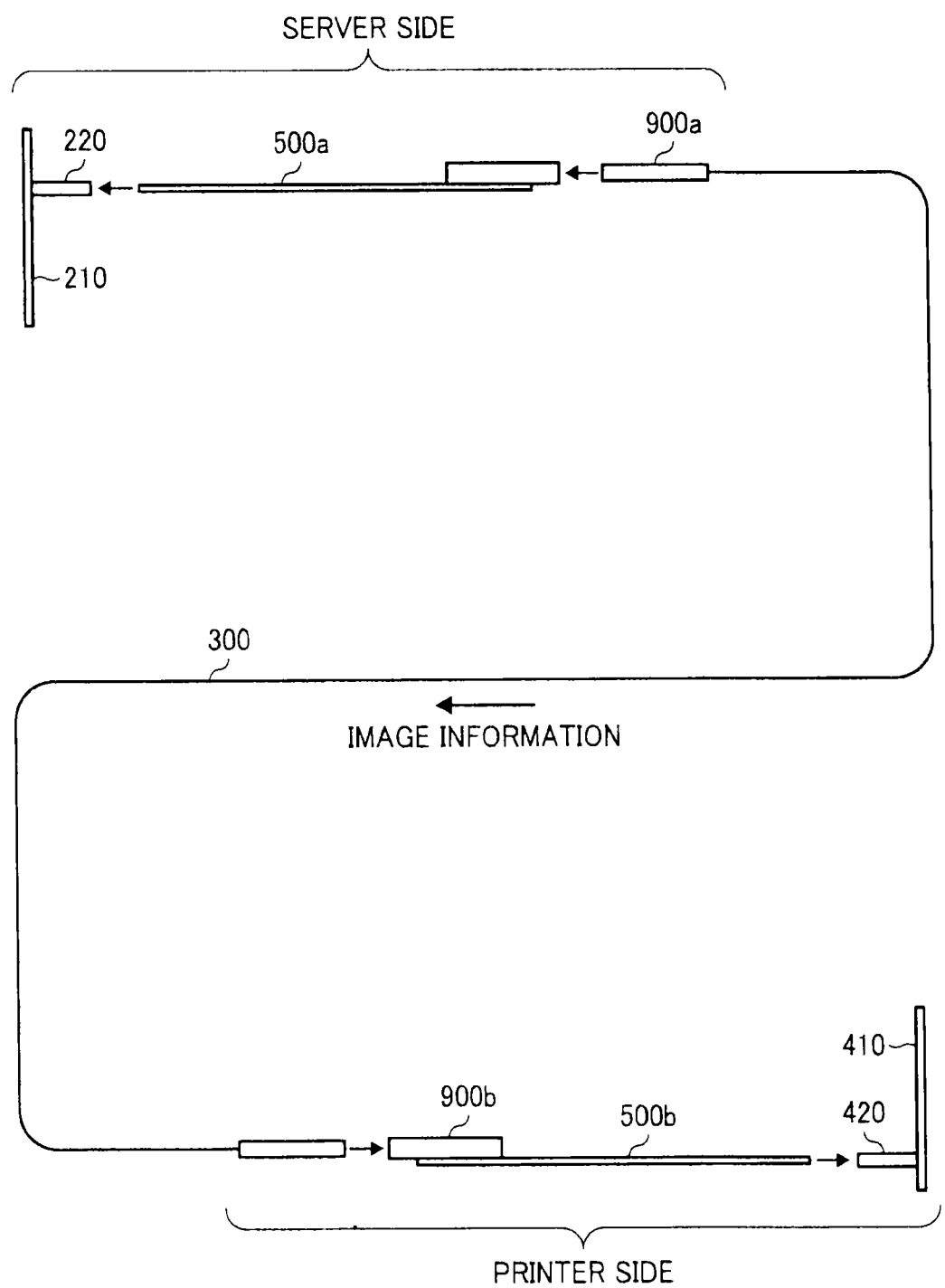
FIG. 9 is a schematic diagram illustrating a bus between the server and the printer.

As illustrated in FIG. 9, the server 200 includes a motherboard 210 and a socket (hereinafter, "PCI-e socket") 220 compliant with a PCI Express specification. The PCI-e socket 220 is mounted on the motherboard 210. An adapter card 500a is installed into the PCI-e socket 220.

As illustrated in FIG. 9, the printer 400 includes a motherboard 410 and a socket (PCI-e socket) 420 compliant with a PCI Express specification. The PCI-e socket 420 is mounted on the motherboard 410. Another adapter card 500b is installed into the PCI-e socket 420.

Connectors 900a & 900b are attached to the adapter cards 500a & 500b, respectively.

The adapter card 500a on the server 200 and the adapter card 500b on the printer 400 are connected to each other via the communication cable 300. Thus, the server 200 and the printer 400 are communicably connected to each other via the communication cable 300, allowing the server 200 and the printer 400 to carry out high-speed data communications.

In the sample embodiment, image information (black image information, cyan image information, magenta image information, and yellow image information) is transmitted from the server 200 to the printer 400 in the form of raster image data. On receiving the image information, the printer 400 forms a color image according to the image information.

Examples of the communication cable 300 include various communication cables, such as a copper cable or an optical active cable compliant with a PCI Express specification and other cables, via which high-speed differential signals can be transmitted.

Figure 10:
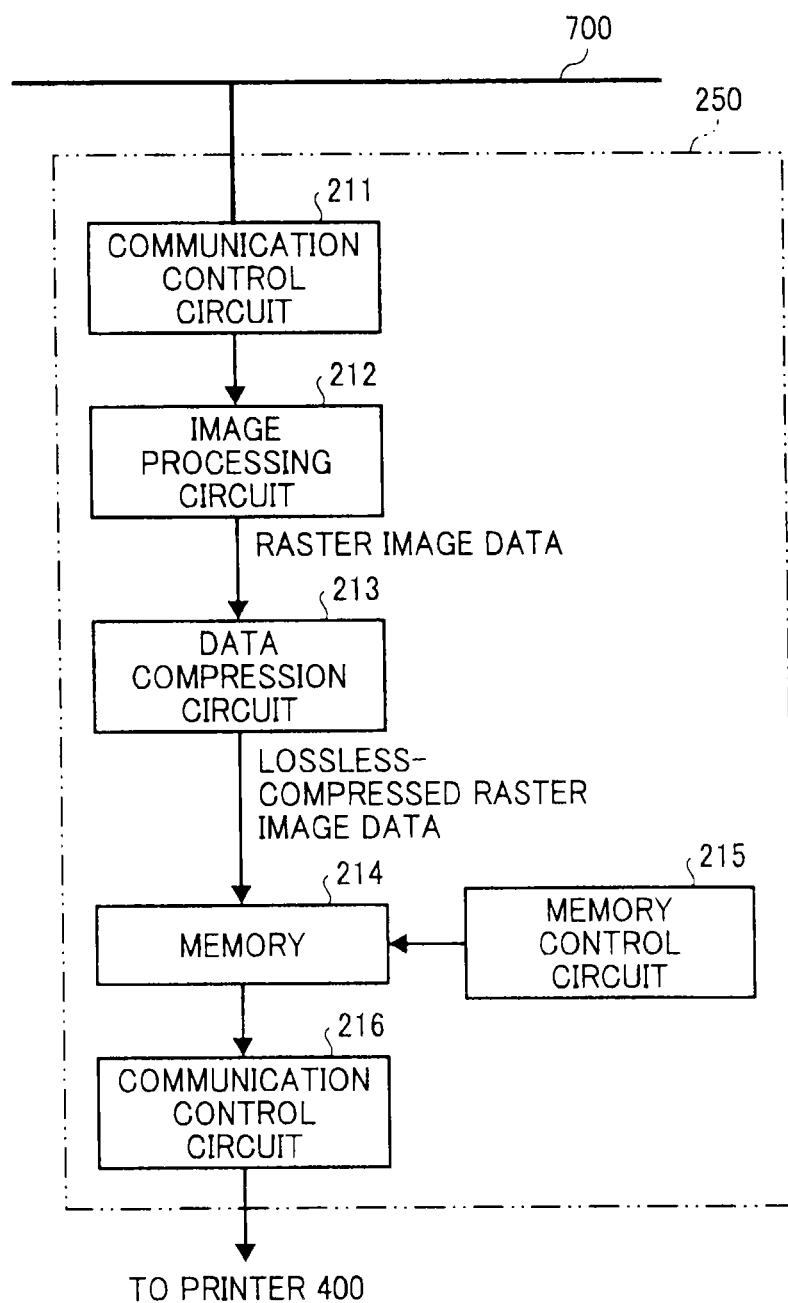
FIG. 10 is a block diagram illustrating the configuration of a controller in the server.

The server 200 includes a controller 250 that outputs, in response to a request from the terminal 600, image information fed from the terminal 600 to the printer 400. An example of the controller 250 is illustrated in FIG. 10.

The controller 250 includes two communication control circuits (211 and 216), an image processing circuit 212, a data compression circuit 213, memory 214, and a memory control circuit 215.

The communication control circuit 211 controls communications to and from the plurality of terminal 600 via the network 700.

The image processing circuit 212 converts the image information fed from the terminal 600 and received at the communication control circuit 211 into raster image data.

The data compression circuit 213 performs lossless compression of the raster image data fed from the image processing circuit 212 and temporarily stores the compressed data in the memory 214.

The memory control circuit 215 monitors the lossless-compressed data accumulated in the memory 214 and, when the data has been accumulated in the memory 214 to be ready for output, reads the lossless-compressed data from the memory 214 and output the data to the communication control circuit 216.

The communication control circuit 216 controls communications to and from the printer 400 via the communication cable 300, and transmits the lossless-compressed raster image data read out from the memory 214 by the memory control circuit 215 to the printer 400.

Figure 11:
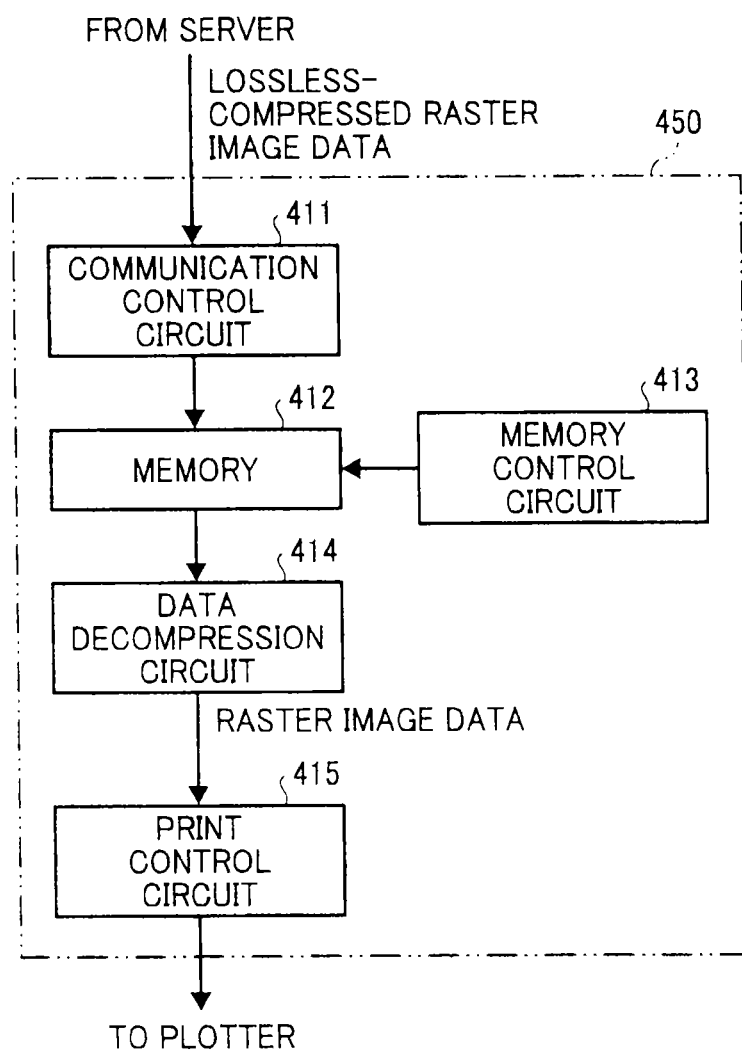
FIG. 11 is a block diagram illustrating the configuration of a controller in the printer.

The printer 400 includes a controller 450 that outputs the lossless-compressed raster image data fed from the server 200 to a plotter. An example of the controller 450 is illustrated in FIG. 11.

The controller 450 includes a communication control circuit 411, memory 412, a memory control circuit 413, a data decompression circuit 414, and a print control circuit 415.

The communication control circuit 411 controls communications to and from the server 200 via the communication cable 300, receives the lossless-compressed raster image data via the communication cable 300, and temporarily stores the data in the memory 412.

The memory control circuit 413 monitors the lossless-compressed raster image data accumulated in the memory 412 and, when the data has been accumulated in the memory 412 to be ready for output, reads the lossless-compressed raster image data from the memory 412 and outputs the data to the data decompression circuit 414.

The data decompression circuit 414 decompresses the lossless-compressed raster image data read out from the memory 412.

The print control circuit 415 outputs the raster image data having undergone decompression performed by the data decompression circuit 414 to the plotter.

Figure 12:
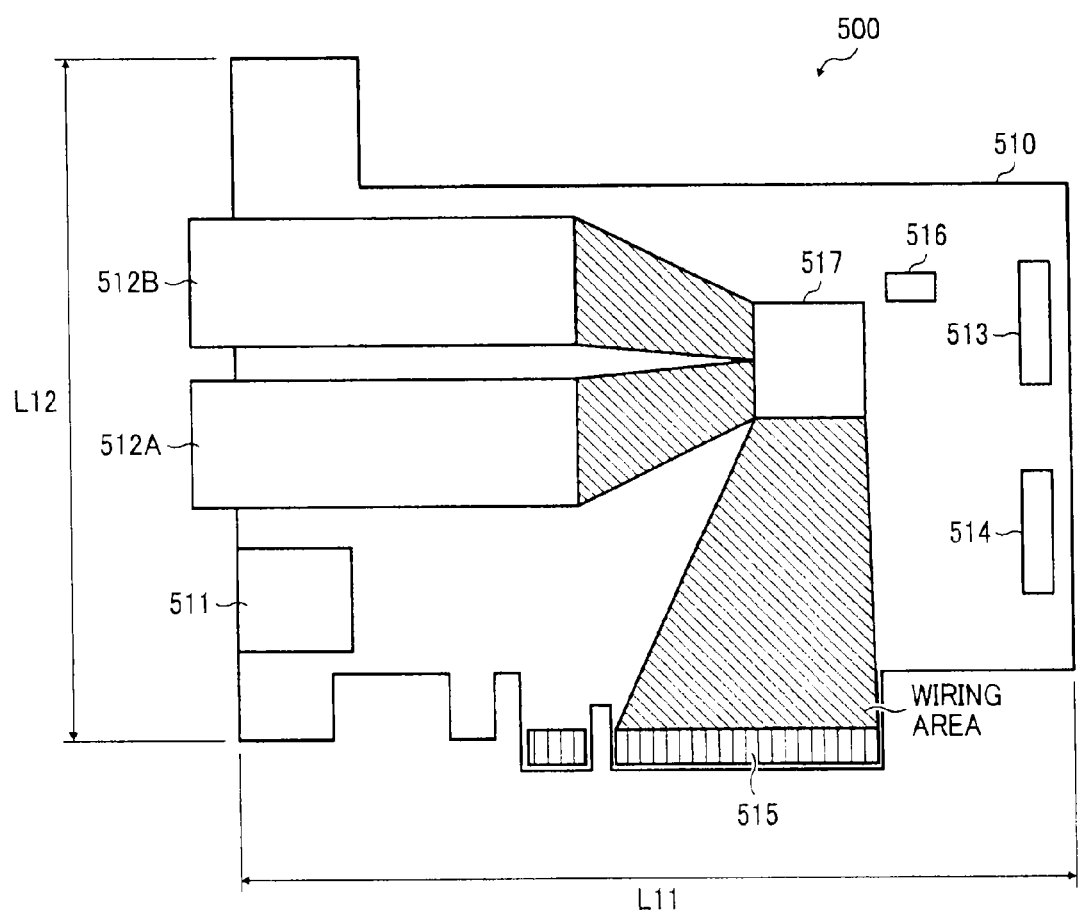
FIG. 12 is a schematic plan view of an example adapter card.

The adapter card 500a/500b is described in detail below. When it is not necessary to differentiate between the adapter card 500a and the adapter card 500b, each of the two adapter cards 500a and 500b is generically referred to as the adapter card 500. FIG. 12 is a schematic plan view of an example of the adapter card 500.

The adapter card 500 includes a board 510, on which two cable connectors (512A and 512B), four connectors (511, 513, 514, and 516), and a PCI-e switch 517 are mounted. The cable connectors 512A and 512B are each to be connected to the communication cable 300. When it is not necessary to differentiate between the cable connector 512A and the cable connector 512B, each of the two cable connectors 512A and 512B is generically referred to as the cable connector 512.

A card edge connector 515 is provided on each surface of the board 510 at a portion near one edge of the board 510. The card edge connector 515 includes terminals that make connection to, when the adapter card 500 is installed into the PCI-e socket 220 on the server 200 or the PCI-e socket 420 on the printer 400, the terminals of the PCI-e socket 220 or 420. For convenience, the surface of the board 510 where the cable connector 512 is mounted is referred to as the side A and the surface opposite from the side B. The length and the width of the board 510, indicated by reference numerals and symbols L11 and L12 in FIG. 12, are, for instance, 105 millimeters and 130 millimeters, respectively.

In FIG. 12, hatch patterns indicate an area where serial signal patterns are arranged with highest priority. The serial signal patterns are PCI Express buses. More specifically, the serial signal patterns are wiring patterns connecting between the card edge connector 515 and the PCI-e switch 517, between the PCI-e switch 517 and the cable connector 512A, and between the PCI-e switch 517 and the cable connector 512B. Meanwhile, an area on the side B corresponding to this wiring area is also a wiring area.

The connector 516 is a connector for supplying electric power to a cooling fan when the cooling fan is mounted. The electric power is supplied from the server 200 or the printer 400 via the card edge connector 515.

In the sample embodiment, the card edge connector 515 is an 8-lane connector. Each of the cable connectors 512A and 512B is a 4-lane connector.

Figure 13:
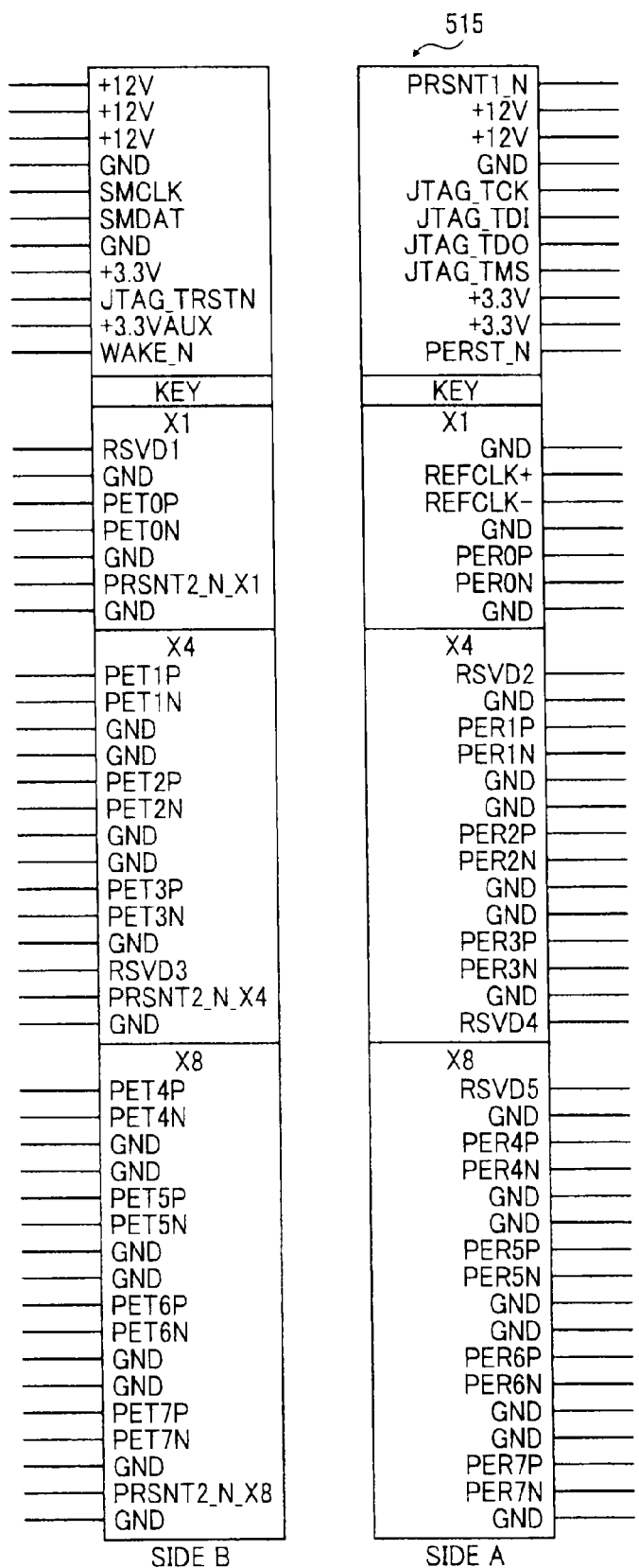
FIG. 13 is a schematic view of an example layout of a plurality of terminals on a card edge connector.

FIG. 13 is a schematic view of an example layout of the plurality of terminals on the card edge connector 515. In the example illustrated in FIG. 13, four terminals for serial data (hereinafter, "serial data terminals"), PET0P, PET0N, PER0P, and PER0N, are arranged in a first lane. PET0P and PET0N are for data transmission; PER0P and PER0N are for data reception.

Four serial data terminals, PET1P, PET1N, PER1P, and PER1N, are arranged in a second lane. PET1P and PET1N are for data transmission; PER1P and PER1N are for data reception.

Four serial data terminals, PET2P, PET2N, PER2P, and PER2N, are arranged in a third lane. PET2P and PET2N are for data transmission; PER2P and PER2N are for data reception.

Four serial data terminals, PET3P, PET3N, PER3P, and PER3N, are arranged in a fourth lane. PET3P and PET3N are for data transmission; PER3P and PER3N are for data reception.

Four serial data terminals, PET4P, PET4N, PER4P, and PER4N, are arranged in a fifth lane. PET4P and PET4N are for data transmission; PER4P and PER4N are for data reception.

Four serial data terminals, PET5P, PET5N, PER5P, and PER5N, are arranged in a sixth lane. PET5P and PET5N are for data transmission; PER5P and PER5N are for data reception.

Four serial data terminals, PET6P, PET6N, PER6P, and PER6N, are arranged in a seventh lane. PET6P and PET6N are for data transmission; PER6P and PER6N are for data reception.

Four serial data terminals, PET7P, PET7N, PER7P, and PER7N, are arranged in an eighth lane. PET7P and PET7N are for data transmission; PER7P and PER7N are for data reception.

Figure 14:
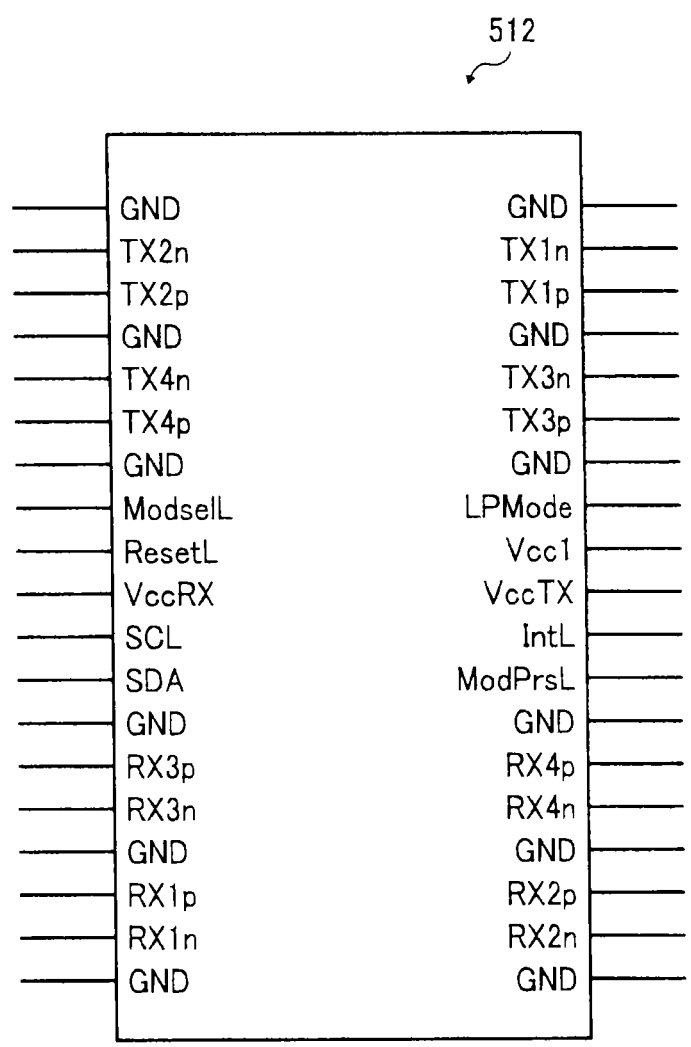
FIG. 14 is a schematic view of an example layout of a plurality of terminals on a cable connector.

FIG. 14 is a schematic view of an example layout of a plurality of terminals on the cable connector 512. In the example illustrated in FIG. 14, four serial data terminals, TX1$p$, TX1$n$, RX1$p$, and RX1$n$, are arranged in a first lane. TX1$p$ and TX1$n$ are for data transmission; RX1$p$ and RX1$n$ are for data reception.

Four serial data terminals, TX2$p$, TX2$n$, RX2$p$, and RX2$n$, are arranged in a second lane. TX2$p$ and TX2$n$ are for data transmission; RX2$p$ and RX2$n$ are for data reception.

Four serial data terminals, TX3$p$, TX3$n$, RX3$p$, and RX3$n$, are arranged in a third lane. TX3$p$ and TX3$n$ are for data transmission; RX3$p$ and RX3$n$ are for data reception.

Four serial data terminals, TX4$p$, TX4$n$, RX4$p$, and RX4$n$, are arranged in a fourth lane. TX4$p$ and TX4$n$ are for data transmission; RX4$p$ and RX4$n$ are for data reception.

Figure 15:
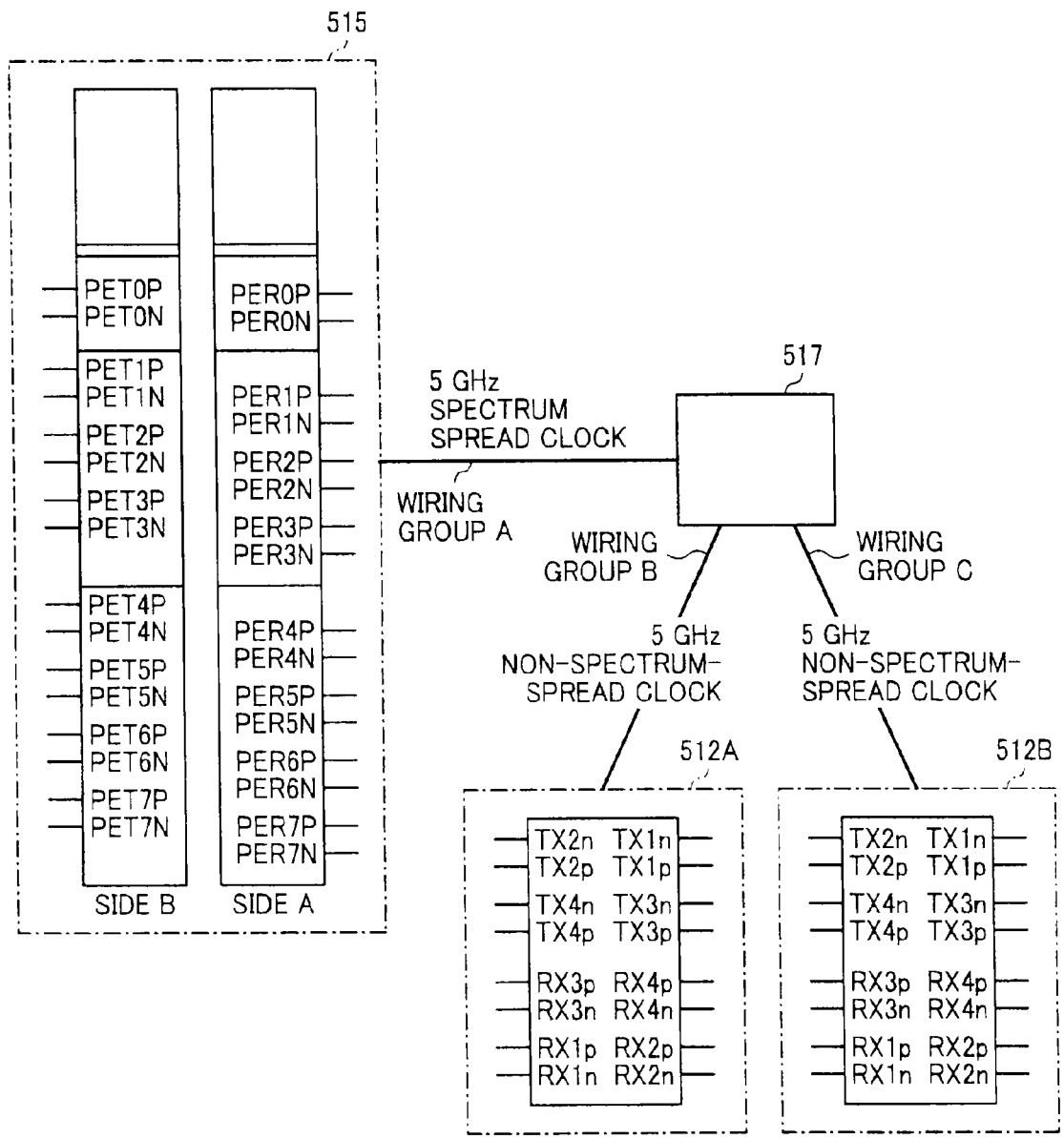
FIG. 15 is a schematic diagram illustrating a plurality of wiring patterns for electrically connecting serial data terminals on the card edge connector, a PCI-e switch, and serial data terminals on the cable connector together.

FIG. 15 is a schematic diagram illustrating a plurality of wiring patterns for electrically connecting the serial data terminals on the card edge connector 515, the PCI-e switch 517, and the serial data terminals on the cable connector 512. In FIG. 15, a group of wiring patterns that electrically connect the serial data terminals (32 terminals in total) on the card edge connector 515 to the PCI-e switch 517 is indicated as a wiring group A, a group of wiring patterns that electrically connect the PCI-e switch 517 to the serial data terminals (16 terminals in total) on the cable connector 512A is indicated as a wiring group B, and a group of wiring patterns that electrically connect the PCI-e switch 517 to the serial data terminals (16 terminals in total) on the cable connector 512B is indicated as a wiring group C.

In this example, clock rate of the wiring group A, that of the wiring group B, and that of the wiring group C are all 5 GHz.

Meanwhile, spectrum spread clock (SSC) is applied to the wiring group A whereas non-spectrum-spread clock (NSSC) is applied to the wiring group B and the wiring group C. Spectrum spread clock is clock of which frequencies are slightly modulated to lower peak of frequency spectrum of clock signals to reduce radiation noise. Non-spectrum-spread clock is clock of which frequency is not modulated but fixed.

More specifically, the PCI-e switch 517 is provided midway of the plurality of wiring patterns that electrically connect the card edge connector 515 to the cable connectors 512A and 512B to split a clock domain of the plurality of wiring patterns into a clock domain (first clock domain) where spectrum spread clock is applied and a clock domain (second clock domain) where non-spectrum-spread clock is applied. Such clock domain splitting can be implemented by using the clock isolation feature of the PCI-e switch 517.

The length of wiring (hereinafter, "wiring length") of the wiring group B and that of the wiring group C are each set to be different from any one of an integral multiple of the clock frequency, a half of the clock frequency, and a quarter of the clock frequency. More specifically, in this example, the clock frequency is 5 GHz; accordingly, each of the wiring lengths is set to a value other than 1.5 centimeters, 3 centimeters, 6 centimeters, and 12 centimeters. If the clock frequency is 2.5 GHz, each of the wiring lengths is set to a value other than 3 centimeters, 6 centimeters, 12 centimeters, and 24 centimeters. For a situation where the clock frequency can be any one of 5 GHz or 2.5 GHz, the wiring length is favorably set to 1 centimeter, for instance.

The PCI-e switch 517 includes an upstream port and downstream NT port. The upstream port is connected to the card edge connector 515 via the wiring group A. The downstream NT port is connected to the cable connector 512A via the wiring group B and to the cable connector 512B via the wiring group C. In the sample embodiment, the PCI-e switch 517 provided on the adapter card 500 on the server 200 corresponds to the first PCI-e switch 20 illustrated in FIG. 3; the PCI-e switch 517 provided on the adapter card 500 on the printer 400 corresponds to the second PCI-e switch 30 illustrated in FIG. 3. Put another way, the PCI-e switches 517 each have a function of effecting an interconnection for via-NT-port communications between the server 200 and the printer 400 connected to each other via the NT port of the server 200 and the NT port of the printer 400 via the communication cable 300. The PCI-e switch 517 also has a function of performing the address translation when the server 200 and the printer 400 carry out communications therebetween.

More specifically, when the server 200 and the printer 400 carry out communications therebetween, the PCI-e switch 517 on the adapter card 500 on the server 200 performs address translation between an address in the address translation area in the address space of the server 200 and an address in the fixed address translation area in the NT space. Similarly, the PCI-e switch 517 on the adapter card 500 on the printer 400 performs address translation between an address in the address translation area in the address space of the printer 400 and an address in the fixed address translation area in the NT space.

The serial data terminals (16 terminals in total) in the first to the fourth lanes on the card edge connector 515 are connected via the NT port of the PCI-e switch 517 to the serial data terminals (16 terminals in total) on the cable connector 512A.

More specifically, PET0P and TX1p, PET0N and TX1n, PER0P and RX1p, and PER0N and RX1n are connected to each other, respectively. Similarly, PET1P and TX2p, PET1N and TX2n, PER1P and RX2p, and PER1N and RX2n are connected to each other, respectively. Similarly, PET2P and TX3p, PET2N and TX3n, PER2P and RX3p, and PER0N and RX3n are connected to each other, respectively. Similarly, PET3P and TX4p, PET3N and TX4n, PER3P and RX4p, and PER3N and RX4n are connected to each other, respectively.

The serial data terminals (16 terminals in total) in the fifth to the eighth lanes on the card edge connector 515 are connected via the NT port of the PCI-e switch 517 to the serial data terminals (16 terminals in total) on the cable connector 512B.

More specifically, PET4P and TX1p, PET4N and TX1n, PER4P and RX1p, and PER4N and RX1n are connected to each other, respectively. Similarly, PET5P and TX2p, PET5N and TX2n, PER5P and RX2p, and PER5N and RX2n are connected to each other, respectively. Similarly, PET6P and TX3p, PET6N and TX3n, PER6P and RX3p, and PER6N and RX3n are connected to each other, respectively. Similarly, PET7P and TX4p, PET7N and TX4n, PER7P and RX4p, and PER7N and RX4n are connected to each other, respectively.

Figure 16:
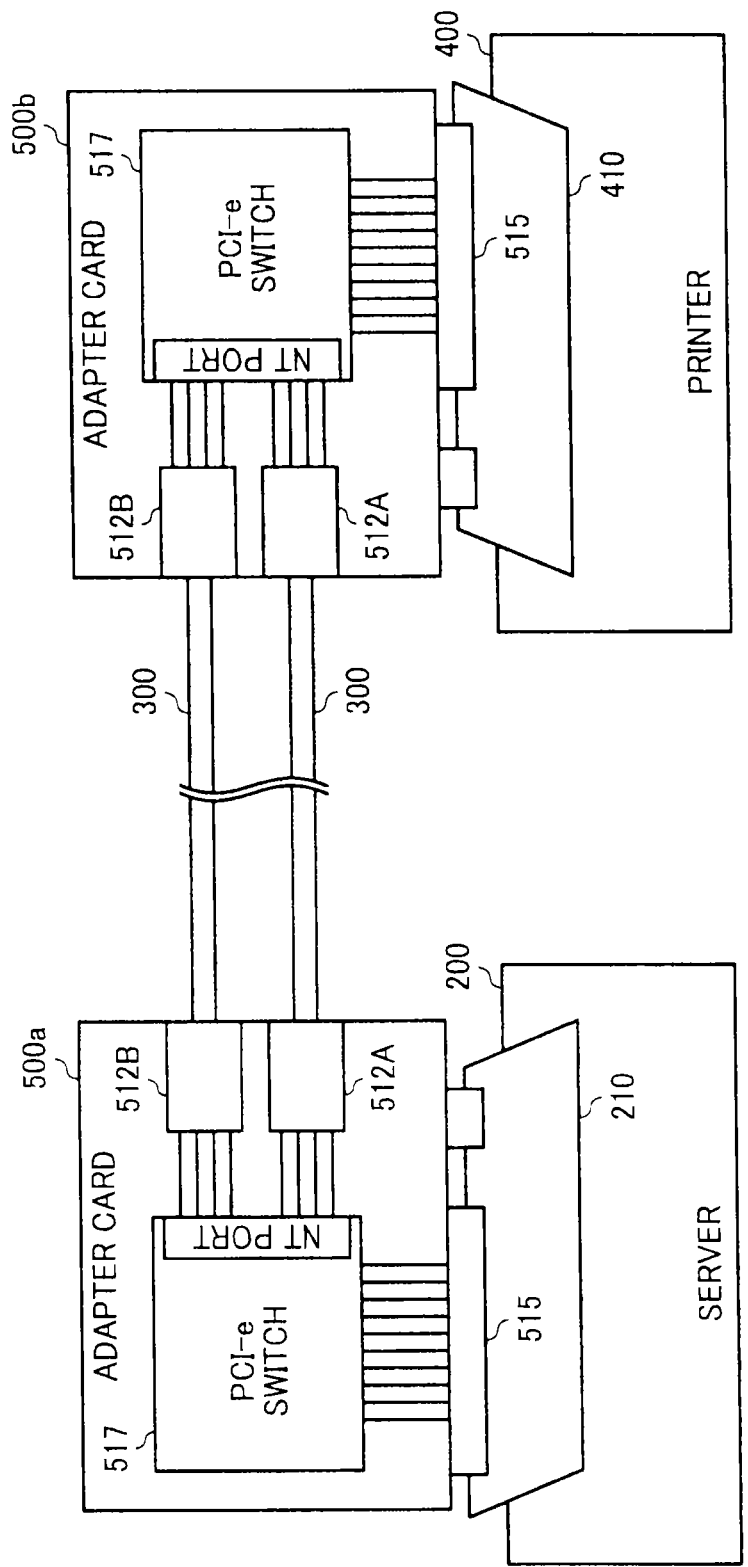
FIG. 16 is a schematic diagram illustrating a state where an NT port of a PCI-e switch of the server and an NT port of a PCI-e switch of the printer are connected to each other for communicable connection between the server and the printer.

The cable connector 512 on the adapter card 500a on the server 200 and the cable connector 512 on the adapter card 500b on the printer 400 are connected to each other via the communication cable 300. Put another way, as illustrated in FIG. 16, in the print system 100 of the sample embodiment, the server 200 and the printer 400 are communicably connected to each other by connecting the NT port of the PCI-e switch 517 on the adapter card 500a on the server 200 and the NT port of the PCI-e switch 517 on the adapter card 500b on the printer 400 to each other.

As discussed above, in the print system 100 of the sample embodiment where the server 200 and the printer 400 are communicably connected to each other by connecting the NT port of the PCI-e switch 517 on the adapter card 500a on the server 200 and the NT port of the PCI-e switch 517 on the adapter card 500b on the printer 400 to each other, the printer 400 is nontransparent to the server 200, while the server 200 is nontransparent to the printer 400. In addition, the server 200 does not recognize the NT port of the PCI-e switch 517 on the adapter card 500b on the printer 400 as a device; similarly, the printer 400 does not recognize the NT port of the PCI-e switch 517 on the adapter card 500a on the server 200 as a device. Accordingly, even when the communication cable 300 connecting the server 200 and the printer 400 together is disconnected, system hang-up will not occur.

In the print system 100, no restriction is imposed on a startup order because link is established normally irrespective of which one of the server 200 and the printer 400 is started up earlier.

Meanwhile, address translation needs to be performed when the server 200 and the printer 400 carry out communications; however, the configuration of the print system 100, in which the NT port of the PCI-e switch 517 on the server 200 is connected to the NT port of the PCI-e switch 517 on the printer 400, address translation can be performed easily. More specifically, the configuration with the NT-port-to-NT-port connection allows addresses for use by the NT port of the PCI-e switch 517 on the server 200 and by the NT port of the PCI-e switch 517 on the printer 400 to belong to the shared address space defined in advance. Accordingly, it is unnecessary for each of the PCI-e switches 517 to have information about a state of the apparatus (the printer 400 or the server 200) on the other end of the communications to perform address translation. This facilitates address translation.

In the print system 100, by virtue of the clock isolation feature of the PCI-e switch 517, the clock domain of the adapter card 500 is split into the first clock domain where spectrum spread clock (SSC) is applied and the second clock domain where non-spectrum-spread clock (NSSC) is applied, and the clock domain between the NT ports of the two PCI-e switches 517 is the second clock domain where non-spectrum-spread clock is applied. Accordingly, communications between the server 200 and the printer 400 can be carried out appropriately while minimizing the electromagnetic interference (EMI).

Figure 17:
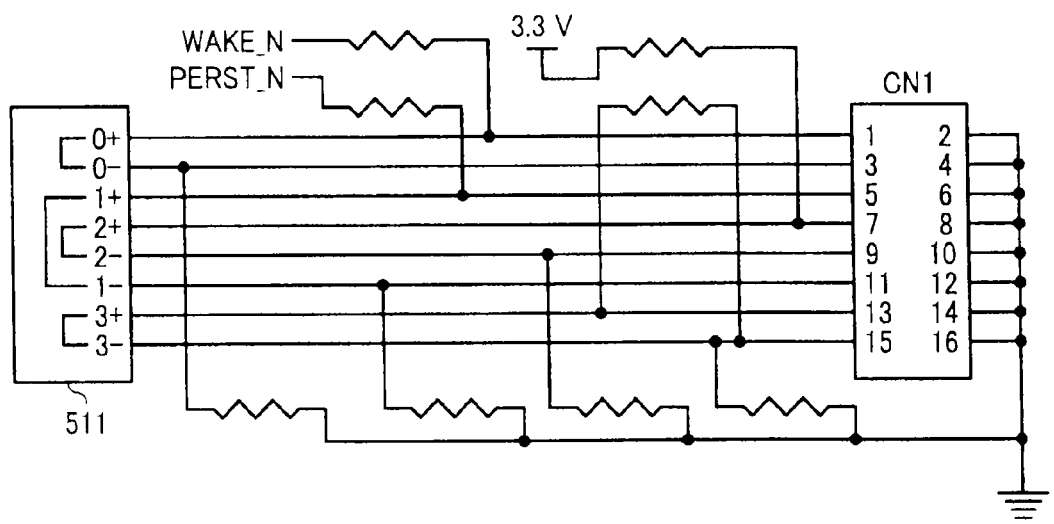
FIG. 17 is a schematic diagram illustrating wiring patterns relevant to a connector.

The adapter card 500 of the sample embodiment can be configured to transmit and receive sideband signals via the connector 511. FIG. 17 is a schematic diagram illustrating wiring patterns relevant to the connector 511. The connector 511 can be a registered jack (RF)-45 connector, which is a modular jack.

Figure 18:
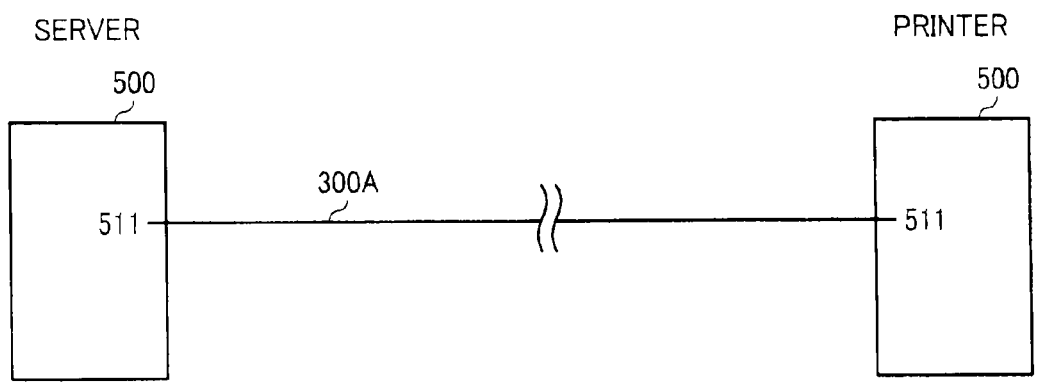
FIG. 18 is a schematic diagram illustrating a bus between the connector at the server and a connector at the printer.

The connector 511 is connected to two terminals (WAKE_N and PERST_N), which are terminals for sideband signals, on the card edge connector 515. This allows the sideband signals, whose transmission rate does not need to be particularly high, to be transmitted via a transmission medium 300A (e.g., a cable compliant with the IEEE 802.3 standard) different from a transmission medium for the serial signals. An example of such a transmission medium 300A is illustrated in FIG. 18. As a result, cost reduction can be achieved.

The connector 511 is connected to a +3.3 V terminal on the card edge connector 515. This allows information about whether the adapter card 500 is installed in the apparatus on the other end of the communications to be obtained.

Two terminals on the connector 511 form a loop on the board 510. This allows information about whether the adapter card 500 is installed in the apparatus on the side where the connector 511 belongs to be obtained.

The adapter card 500 of the sample embodiment can be configured to perform optical transmission. The adapter card 500 configured for optical transmission is described below. The cable connector 512, the connector 900a/900b, and the communication cable 300 are referred to as the transceiver socket 512, the optical transceiver 900, and the optical cable 300, respectively, below.

Figure 19:
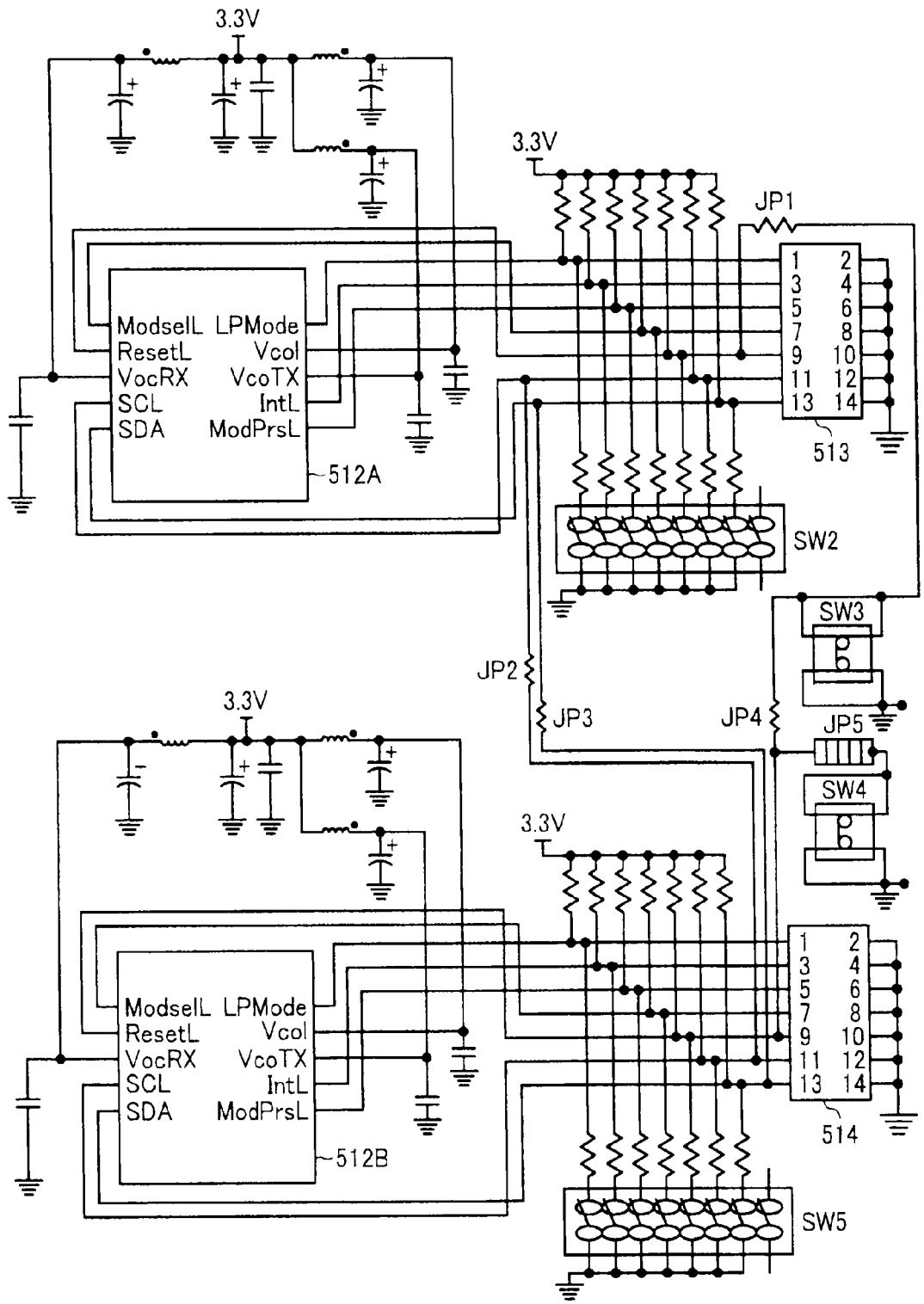
FIG. 19 is a schematic diagram illustrating a plurality of wiring patterns for electrically connecting two connecters to terminals, on two transceiver sockets, for control signals for optical transceivers.
Figure 20:
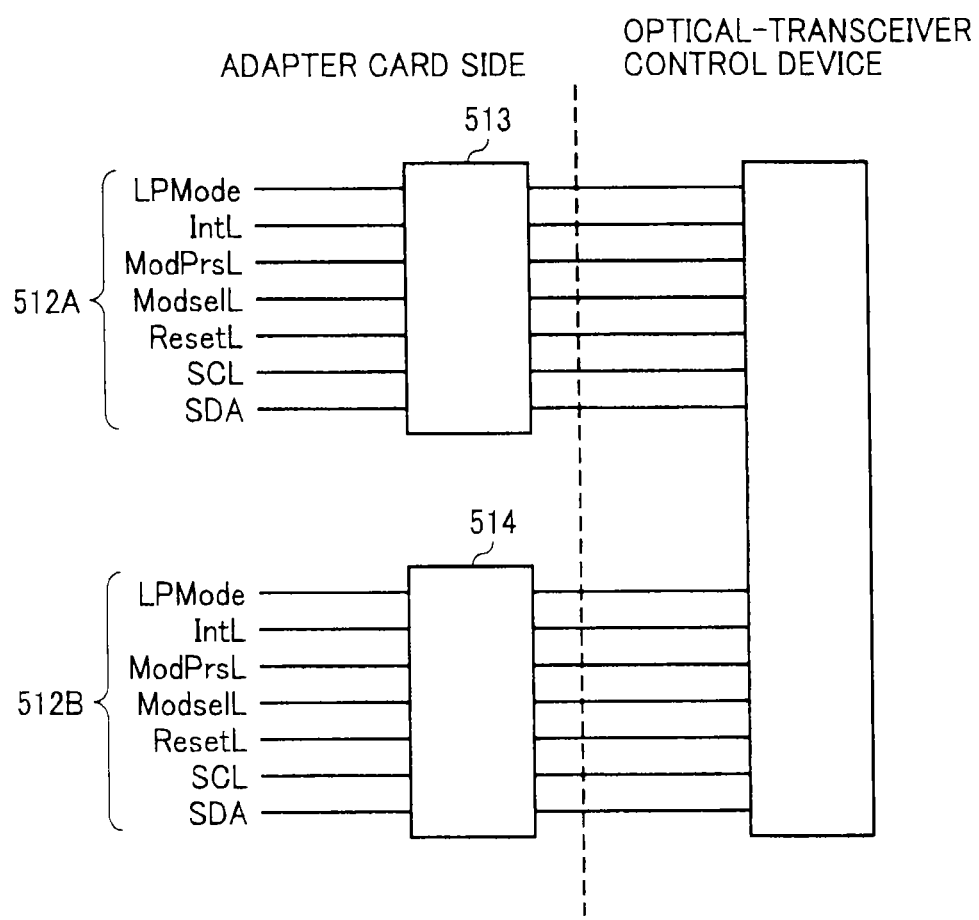
FIG. 20 is a schematic diagram illustrating connectors and a connected state between the connectors and an external apparatus (optical-transceiver control device)

FIG. 19 illustrates a plurality of wiring patterns for electrically connecting the two connecters (513 and 514) to terminals (LPMode, IntL, ModPrsL, ModSelL, ResetL, SCL, and SDA), which are for control signals for the optical transceivers 900, in the two transceiver sockets (512A and 512B). In the sample embodiment, the connector 513 is provided to receive signals for controlling the optical transceiver 900 inserted into the transceiver socket 512A, from an external apparatus (optical-transceiver control device) (see FIG. 20). The connector 514 is provided to receive signals for controlling the optical transceiver 900 inserted into the transceiver socket 512B from the external apparatus (optical-transceiver control device) (see FIG. 20).

The terminal LPMode is used to set a low-power mode. The terminal IntL is used to generate an interrupt. The terminal ModPrsL is used to indicate presence of an optical transceiver. The terminal ModSelL is used to select an optical transceiver. The terminal ResetL is used to reset an optical transceiver. The terminal SCL is used to configure serial interface clock. The terminal SDA is used to configure serial interface data.

Jumper chips (JP1 to JP5) capable of electrically coupling the wiring patterns that electrically connect the connector 513 to the transceiver socket 512A and the wiring patterns that electrically connect the connector 514 to the transceiver socket 512B together are provided on the board 510. This allows an external apparatus connected to any one of the connector 513 and the connector 514 to control the optical transceivers 900 inserted into the transceiver socket 512A and the transceiver socket 512B simultaneously.

Two dual in-line package (DIP) switches (SW2 and SW5) are provided on the board 510. The DIP switch SW2 is used to configure operating condition of the optical transceiver 900 inserted into the transceiver socket 512A on the board 510. The DIP switch SW5 is used to configure operating condition of the optical transceiver 900 inserted into the transceiver socket 512B on the board 510.

Figure 21:
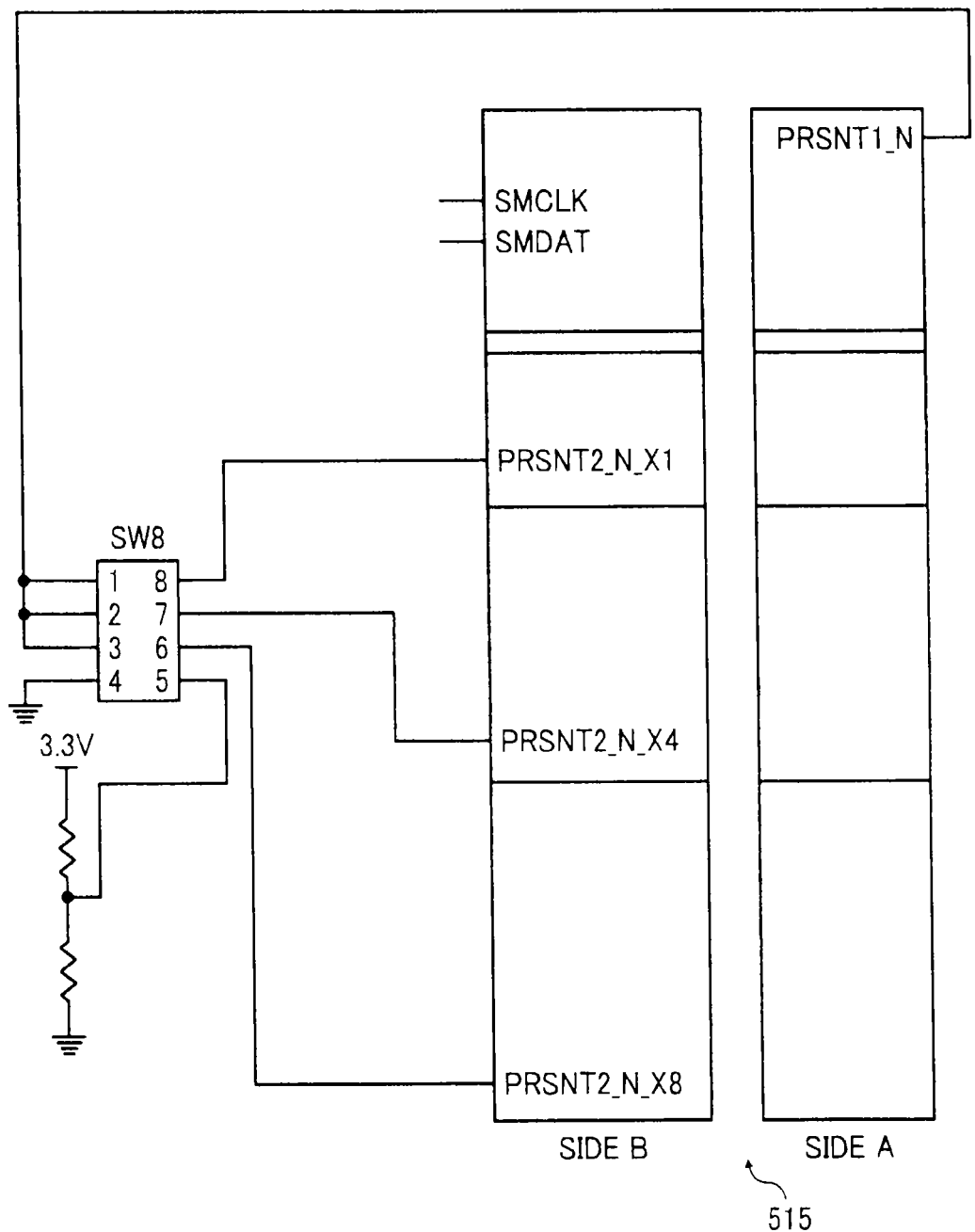
FIG. 21 is a schematic diagram illustrating a switch SW8 for use in selecting a mode of the adapter card from 1-lane mode, 4-lane mode, and 8-lane mode.

As illustrated in FIG. 21, a switch (SW8) for use in selecting a mode of the adapter card 500 from 1-lane mode, 4-lane mode, and 8-lane mode is provided on the board 510.

Figure 22:
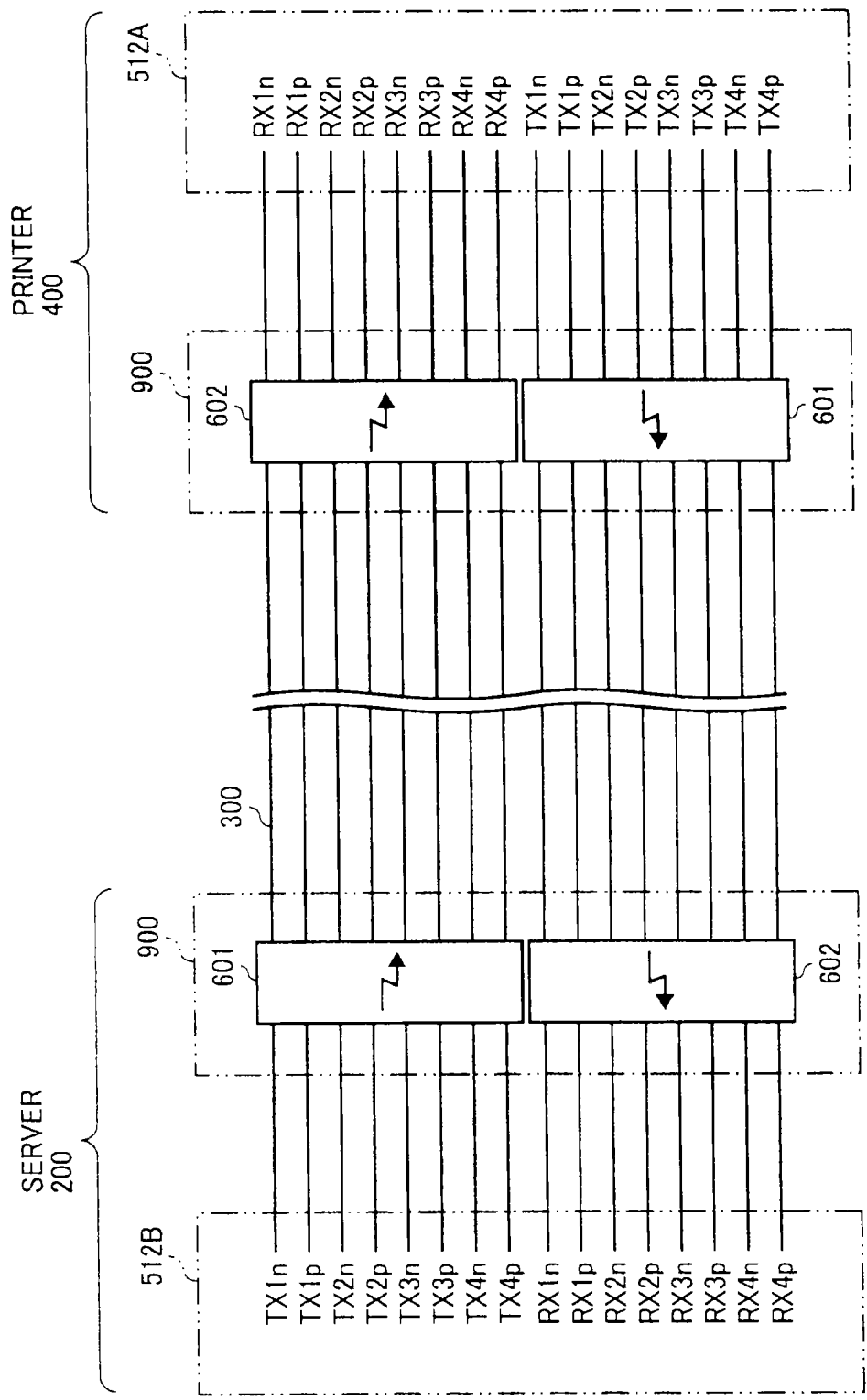
FIG. 22 is a schematic diagram illustrating the optical transceiver.
Figure 23:
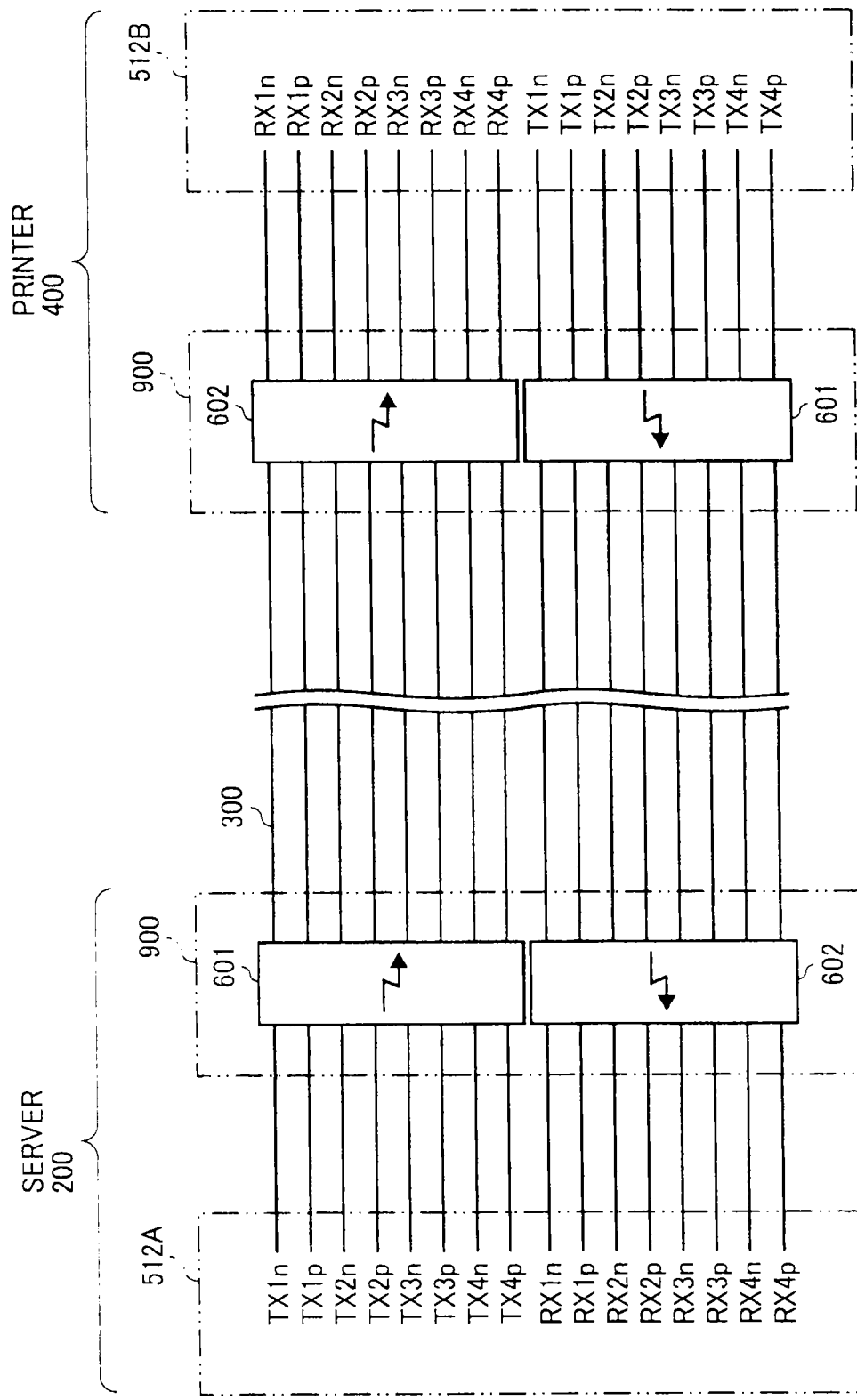
FIG. 23 is another schematic diagram illustrating the optical transceiver.

Each of the optical transceivers 900 is an optical transceiver compliant with a quad small form-factor pluggable (QSFP) specification. FIG. 22 and FIG. 23 illustrate an example of the optical transceivers 900. As illustrated in FIG. 22 and FIG. 23, each of the optical transceivers 900 includes a first conversion circuit 601 for converting signals (electric signals) input to TX1n to TX4n and TX1p to TX4p into optical signals and outputs the optical signals to the optical cable 300 and a second conversion circuit 602 for converting signals (optical signals) input via the optical cable 300 into electric signals and outputs the electric signals to RX1n to RX4n and RX1p to RX4p.

This configuration allows data pieces output from TX1n to TX4n on the server 200 to be transmitted to RX1n to RX4n on the printer 400 and data pieces output from the TX1p to TX4p on the server 200 to be transmitted to RX1p to RX4p on the printer 400.

Similarly, data pieces output from TX1n to TX4n on the printer 400 are transmitted to RX1n to RX4n on the server 200 and data pieces output from the TX1p to TX4p on the printer 400 to be transmitted to RX1p to RX4p on the server 200.

As is apparent from the above discussion, in the print system 100 according to the sample embodiment, the server 200 corresponds to a first apparatus; the printer 400 corresponds to a second apparatus; the optical cable 300 corresponds to a transmission medium. The adapter card 500 corresponds to an adapter according to an aspect of the present invention.

A communication method according to an aspect of the present invention is implemented by the adapter card 500.

As discussed above, in the print system 100 according to the sample embodiment, the server 200 and the printer 400 are connected to each other via the optical cable 300.

Each of the server 200 and the printer 400 includes the PCI-e socket compliant with a PCI Express specification. The adapter card 500 is inserted into each of the PCI-e sockets.

The adapter card 500 includes the board 510, the card edge connectors 515 provided on the board 510 at a portion near the one edge of the board 510, the two transceiver sockets (512A and 512B) mounted on the board 510, the PCI-e switch 517, and the four connectors (511, 513, 514, and 516).

More specifically, the PCI-e switch 517 is provided midway of the plurality of wiring patterns that electrically connect the card edge connector 515 to the two transceiver sockets (512A and 512B) to split a clock domain of the plurality of wiring patterns into a clock domain where spectrum spread clock is applied and a clock domain where non-spectrum-spread clock is applied.

This configuration allows spectrum spread clock to be applied to a clock domain between the motherboard and the PCI-e switch 517, thereby reducing a clock domain where non-spectrum-spread clock is applied. Applying non-spectrum-spread clock to a clock domain between the PCI-e switch 517 and the optical transceiver sockets (512A and 512B) allows synchronization with the apparatus (hereinafter, "communication counterpart") on the other end of communications. Furthermore, establishing connections with the communication counterpart by inserting the optical cable 300 into the optical transceiver sockets (512A and 512B) allows reduction in electromagnetic interference (EMI) even when non-spectrum-spread clock is used in communications to and from the communication counterpart.

Figure 24:
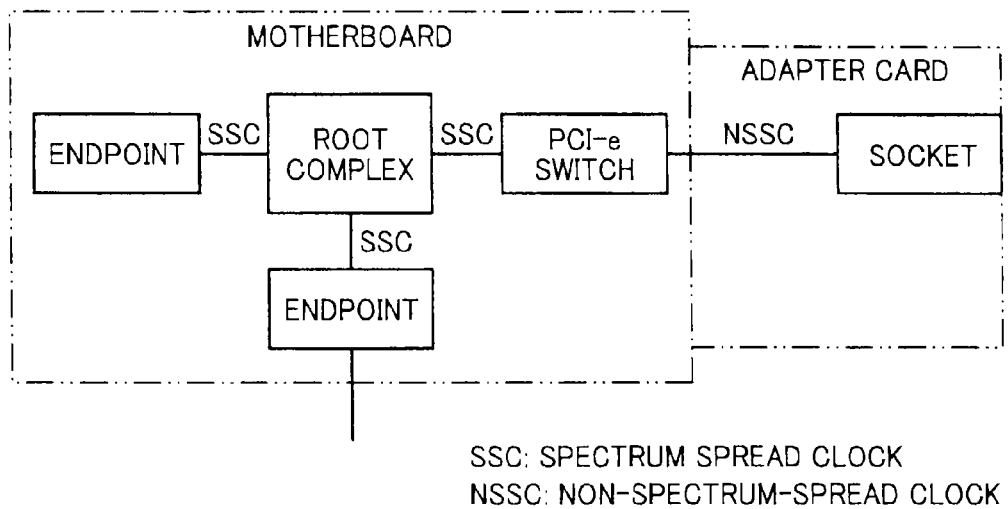
FIG. 24 is a schematic diagram for explaining an advantage of the PCI-e switch of the sample embodiment.

Meanwhile, when an adapter card not including the PCI-e switch 517 is mounted on a motherboard, on which a PCI-e switch is mounted, non-spectrum-spread clock is applied to a clock domain between the PCI-e switch and a socket of the adapter card. An example of this configuration is illustrated in FIG. 24.

Figure 25:
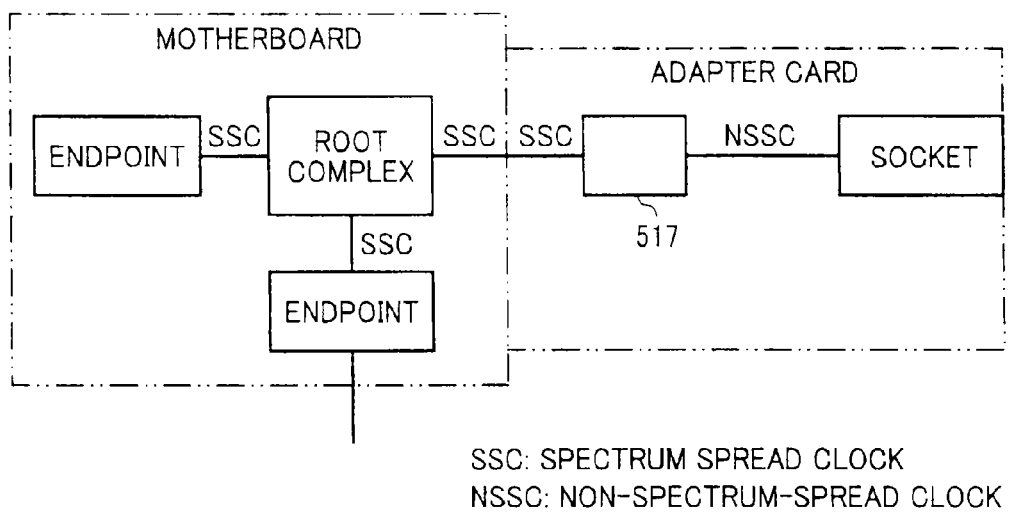
FIG. 25 is another schematic diagram for explaining the advantage of the PCI-e switch of the sample embodiment.

In contrast, when the adapter card 500 according to the sample embodiment is mounted on a motherboard, spectrum-spread clock is applied to a clock domain between the motherboard and the PCI-e switch 517. An example of this configuration is illustrated in FIG. 25.

Hence, the sample embodiment achieves reduction in electromagnetic interference (EMI) in data communications.

The sample embodiment also achieves cost reduction because the adapter card 500 is not required to include a chip to perform high-speed conversion of transmitting information and receiving information. The sample embodiment also allows data transmission and reception in compliant with a PCI Express specification, thereby achieving data transmission and reception without sacrificing effective transfer rate of PCI Express.

Put another way, the sample embodiment allows apparatus-to-apparatus data communications via an interface compliant with a PCI Express specification without sacrificing cost and effective transfer rate.

Meanwhile, mounting positions of the connector and the like in the sample embodiment are only exemplary and are not limited thereto.

Figure 26:
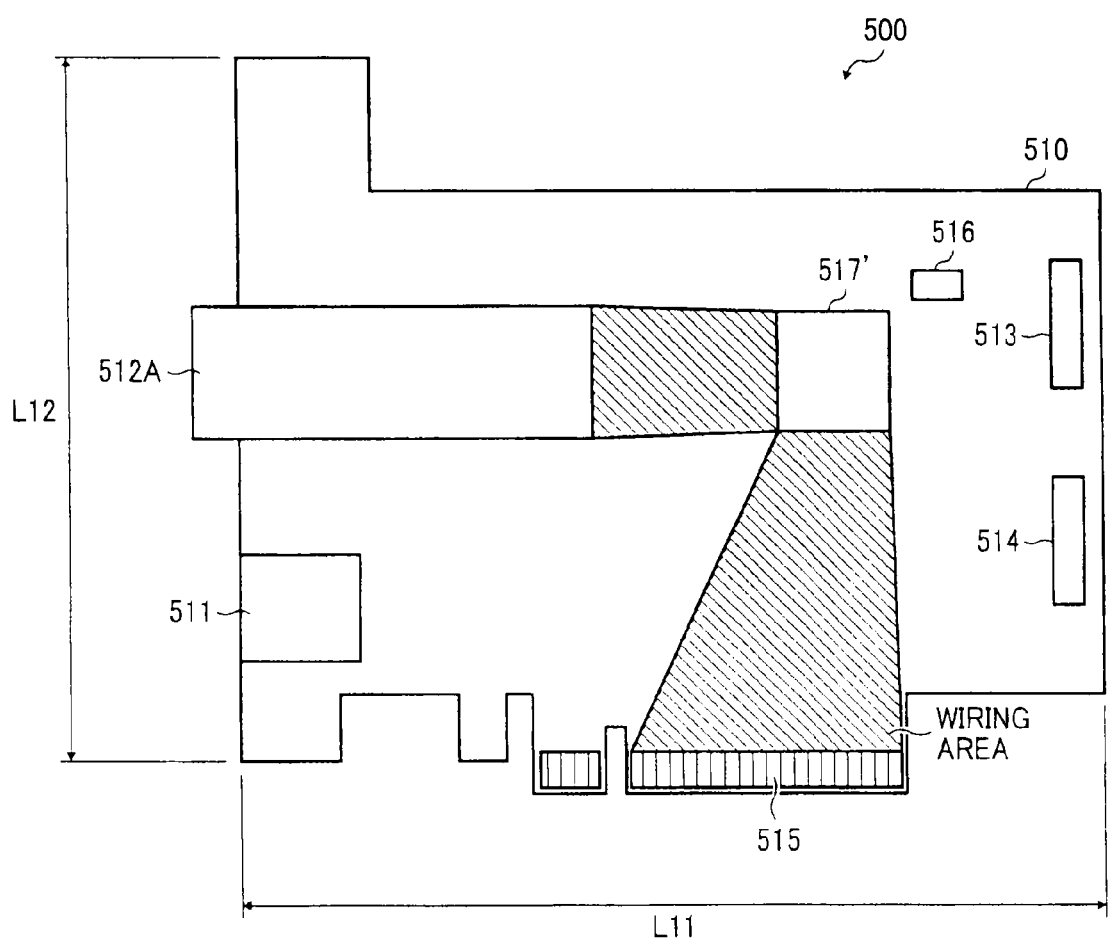
FIG. 26 is a schematic diagram illustrating a modification of the adapter card.
Figure 27:
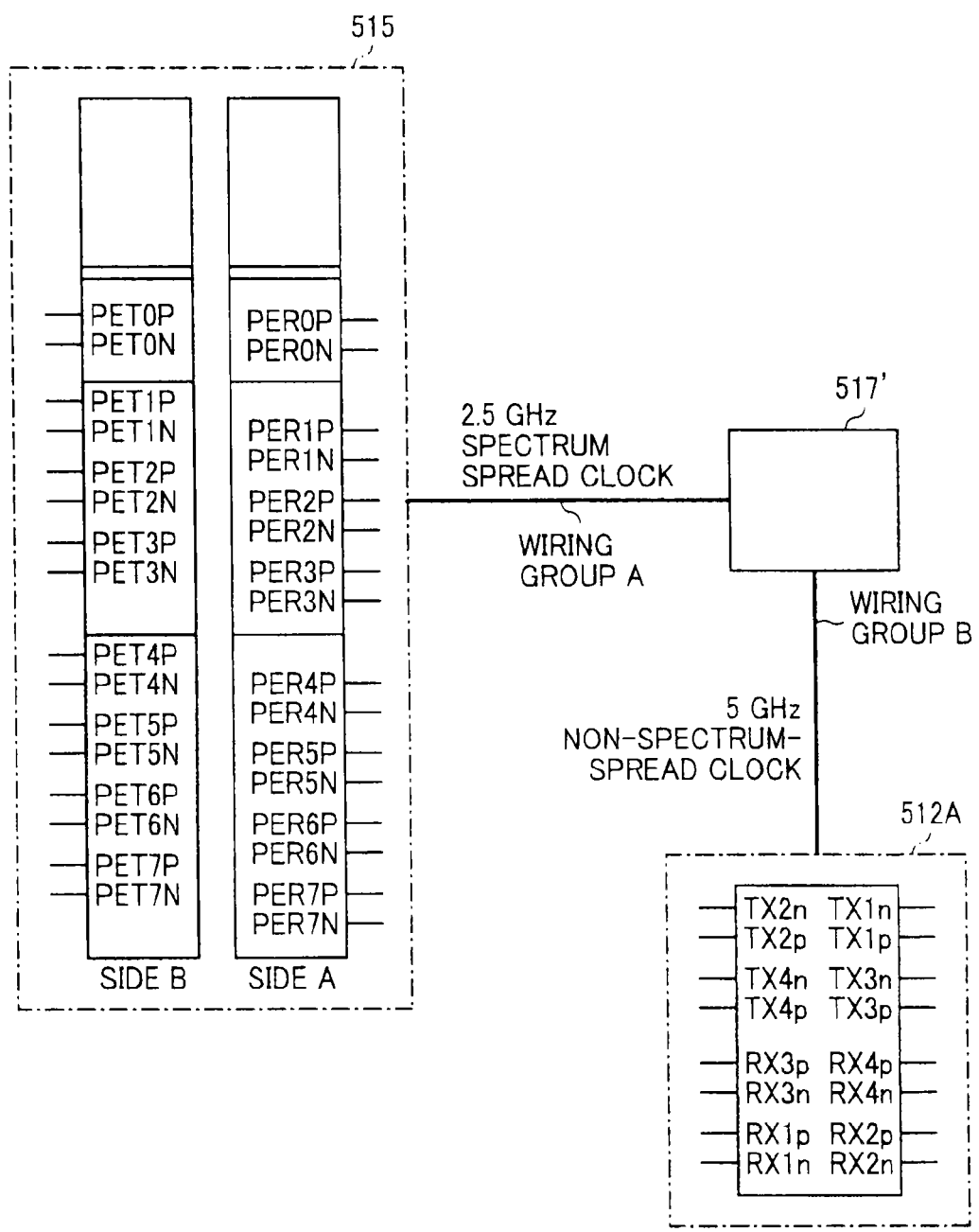
FIG. 27 is another schematic diagram illustrating the modification of the adapter card.

For instance, in a situation where clock rate of serial data output from the server 200 is 2.5 GHz and the serial data is to be transferred to the printer 400 at a clock rate of 5 GHz, a PCI-e switch 517' capable of changing a clock rate and serving as a bridge can be used in lieu of the PCI-e switch 517. An example of this configuration is illustrated in FIG. 26 and FIG. 27. For this configuration, the number of essential transceiver sockets is one.

In the sample embodiment discussed above, each of the optical transceivers is an optical transceiver compliant with the QSFP specification; however, the optical transceiver is not limited thereto. For instance, any one of a small form-factor pluggable (SFP) transceiver, an SFP+ transceiver, a QSFP+ transceiver, and a 10-Gigabit small form-factor pluggable (XFP) transceiver can be employed.

In the sample embodiment discussed above, the card edge connector 515 supports eight lanes; however, the number of lanes supported by the card edge connector 515 is not limited thereto.

The clock rate in the sample embodiment is only an example and not limited thereto.

As discussed above, the adapter card 500 of the sample embodiment is appropriate for reducing electromagnetic interference (EMI) in apparatus-to-apparatus data communications without sacrificing cost and effective transfer rate. The sample embodiment is appropriate for reducing electromagnetic interference (EMI) in data communications without sacrificing cost and effective transfer rate. The information system of the sample embodiment is appropriate for reducing electromagnetic interference (EMI) in data communications without sacrificing cost and effective transfer rate. The communication method of sample embodiment is appropriate for reducing electromagnetic interference (EMI) in data communications without sacrificing cost and effective transfer rate.

The print system 100 discussed above is a sample embodiment and can be modified in various manners without departing from the scope of the embodiment. For instance, mounting positions and/or layout of the connectors and the like on the adapter card 500 are not limited to those presented in the sample embodiment and can be modified as required.

For instance, in a situation where clock rate of serial data output from the server 200 is 2.5 GHz and the serial data is to be transferred to the printer 400 at a clock rate of 5 GHz, a PCI-e switch 517' capable of changing a clock rate and serving as a bridge can be used as the PCI-e switch 517. For this configuration, the number of required cable connectors 512 is one.

The sample embodiment is an example where the embodiment is applied to the print system 100 where the server 200 and the printer 400 are communicably connected to each other; however, a system, to which the embodiment is applicable, is not limited thereto, and the present embodiment can be applied to various communication systems for carrying out data communications between or among a plurality of hosts.

In the sample embodiment, data communications are carried out in compliant with a PCI Express specification; however, the embodiment can be effectively applied to data communications compliant with a specification, other than the PCI Express specification, that places restriction on host-to-host communications.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus for carrying out communications to and from an external apparatus, the external apparatus including a first interconnecting unit having a first non-transparent port and effecting an interconnection for communications via the first non-transparent port, the communication apparatus comprising:
   a second interconnecting unit including a second non-transparent port communicably connected to the first non-transparent port, the second interconnecting unit effecting an interconnection for communications via the second non-transparent port,
   wherein the second interconnecting unit performs, when the communication apparatus carries out communications to and from the external apparatus via the second non-transparent port, address translation between an address for use by the communication apparatus and an address for use by the second non-transparent port, and
   wherein when the communication apparatus carries out communications to and from the external apparatus via the second non-transparent port, the address for use by the communication apparatus is translated into the address for use by the second non-transparent port, which is a first address in an address space in common with the first non-transparent port and the second non-transparent port, and an address for use by the external apparatus is translated into a second address in the address space in common with the first non-transparent port and the second non-transparent port.

2. The communication apparatus according to claim 1, wherein the first address in the address space in common with the first non-transparent port and the second non-transparent port is a fixed address.

3. A communication system including a first apparatus and a second apparatus, the first apparatus and the second apparatus being communicably connected to each other, the communication system comprising:
   a first interconnecting unit provided on the first apparatus, including a first non-transparent port, and effecting an interconnection for communications via the first non-transparent port; and
   a second interconnecting unit provided on the second apparatus, including a second non-transparent port, and effecting an interconnection for communications via the second non-transparent port, the second non-transparent port being communicably connected to the first non-transparent port, wherein the first interconnecting unit performs, when the first apparatus carries out communications to and from the second apparatus via the first non-transparent port, address translation between an address for use by the first apparatus and an address for use by the first non-transparent port, wherein the second interconnecting unit performs, when the second apparatus carries out communications to and from the first apparatus via the second non-transparent port, address translation between an address for use by the second apparatus and an address for use by the second non-transparent port, and wherein when the first apparatus carries out communications to and from the second apparatus, the address for use by the first apparatus is translated into the address for use by the first non-transparent port, which is a first address in an address space in common with the first non-transparent port and the second non-transparent port, and the address for use by the second apparatus is translated into the address for use by the second non-transparent port, which is a second address in the address space in common with the first non-transparent port and the second non-transparent port.

4. The communication apparatus according to claim 3, wherein one or more of the first address and the second address in the address space in common with the first non-transparent port and the second non-transparent port is a fixed address.

5. The communication system of claim 3, wherein the first non-transparent port and the second non-transparent port are communicably connected to each other via a communication cable.

6. The communication system of claim 3, wherein each of the first interconnecting unit and the second interconnecting unit is a switch compliant with a PCI Express specification.

7. The communication system of claim 3,
wherein the first interconnecting unit is provided on a board of an adapter card plugged into an expansion slot of the first apparatus, and
wherein the second interconnecting unit is provided on a board of an adapter card plugged into an expansion slot of the second apparatus.

8. The communication apparatus according to claim 1, wherein the second non-transparent port is communicably connected directly to the first non-transparent port.

9. The communication system of claim 3, wherein the second non-transparent port is communicably connected directly to the first non-transparent port.

* * * * *